(12) United States Patent
Mazzagatti et al.

(10) Patent No.: US 7,716,241 B1
(45) Date of Patent: May 11, 2010

(54) STORING THE REPOSITORY ORIGIN OF DATA INPUTS WITHIN A KNOWLEDGE STORE

(75) Inventors: Jane Campbell Mazzagatti, Blue Bell, PA (US); Jane Van Keuren Claar, Bethlehem, PA (US)

(73) Assignee: Unisys Corporation, Blue Bell, PA (US)

( * ) Notice: Subject to any disclaimer, the term of this patent is extended or adjusted under 35 U.S.C. 154(b) by 479 days.

(21) Appl. No.: 10/975,332

(22) Filed: Oct. 27, 2004

(51) Int. Cl.
*G06F 7/00* (2006.01)
*G06F 17/30* (2006.01)

(52) U.S. Cl. ...................... 707/782; 707/791

(58) Field of Classification Search ............... 707/1–10, 707/100–104.1, 200–206
See application file for complete search history.

(56) References Cited

U.S. PATENT DOCUMENTS

| | | |
|---|---|---|
| 4,286,330 A | 8/1981 | Isaacson |
| 5,245,337 A | 9/1993 | Bugajski |
| 5,293,164 A | 3/1994 | Bugajski |
| 5,592,667 A | 1/1997 | Bugajski |
| 5,630,125 A | 5/1997 | Zellweger |
| 5,634,133 A | 5/1997 | Kelley |
| 5,829,004 A | 10/1998 | Au |
| 5,894,311 A | 4/1999 | Jackson |
| 5,918,229 A | 6/1999 | Davis et al. |
| 5,930,805 A | 7/1999 | Marquis |
| 5,963,965 A | 10/1999 | Vogel |
| 5,966,709 A | 10/1999 | Zhang |
| 5,970,490 A | 10/1999 | Morgenstem |
| 5,978,794 A | 11/1999 | Agrawal et al. |
| 5,983,232 A | 11/1999 | Zhang |
| 6,018,734 A | 1/2000 | Zhang |
| 6,029,170 A | 2/2000 | Garger |
| 6,031,993 A | 2/2000 | Andrews et al. |
| 6,102,958 A | 8/2000 | Meystel |

(Continued)

FOREIGN PATENT DOCUMENTS

EP  0 079 465  1/1985

(Continued)

OTHER PUBLICATIONS

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.*

(Continued)

*Primary Examiner*—Jean B Fleurantin
(74) *Attorney, Agent, or Firm*—Richard J. Gregson; Susan Murphy

(57) ABSTRACT

An effective means for building an interlocking trees datastore from multiple data sources that contained within the datastore the knowledge of the origin of the data was needed, and is thus described herein. Should it be desired or necessary to identify the different sources of data within the Kstore data structure, the present invention teaches how an additional field for the origin of the data is created, how the origin of the data is stored in that newly created field, and how the interlocking trees data store takes that field and creates nodes within the structure, therefore embedding the origin information within the knowledge contained in the Kstore data structure.

23 Claims, 16 Drawing Sheets

U.S. PATENT DOCUMENTS

| | | | |
|---|---|---|---|
| 6,115,715 | A | 9/2000 | Traversat et al. |
| 6,138,115 | A | 10/2000 | Agrawal et al. |
| 6,138,117 | A | 10/2000 | Bayardo |
| 6,144,962 | A | 11/2000 | Weinberg et al. |
| 6,160,549 | A | 12/2000 | Touma et al. |
| 6,233,575 | B1 | 5/2001 | Agrawal et al. |
| 6,275,817 | B1 | 8/2001 | Reed et al. |
| 6,278,987 | B1 | 8/2001 | Reed et al. |
| 6,286,002 | B1 | 9/2001 | Axaopoulos et al. |
| 6,341,281 | B1 | 1/2002 | MacNicol et al. |
| 6,356,902 | B1 | 3/2002 | Tan et al. |
| 6,360,224 | B1 | 3/2002 | Chickering |
| 6,373,484 | B1 | 4/2002 | Orell et al. |
| 6,381,600 | B1 | 4/2002 | Lau |
| 6,389,406 | B1 | 5/2002 | Reed et al. |
| 6,394,263 | B1 | 5/2002 | McCrory |
| 6,453,314 | B1 | 9/2002 | Chan et al. |
| 6,470,277 | B1 | 10/2002 | Chin et al. |
| 6,470,344 | B1 * | 10/2002 | Kothuri et al. .............. 707/100 |
| 6,473,757 | B1 | 10/2002 | Garofalakis et al. |
| 6,477,683 | B1 | 11/2002 | Killian et al. |
| 6,499,026 | B1 | 12/2002 | Rivette et al. |
| 6,505,184 | B1 | 1/2003 | Reed et al. |
| 6,505,205 | B1 | 1/2003 | Kothuri et al. |
| 6,581,063 | B1 | 6/2003 | Kirkman |
| 6,591,272 | B1 * | 7/2003 | Williams .................... 707/102 |
| 6,604,114 | B1 | 8/2003 | Toong et al. |
| 6,615,202 | B1 | 9/2003 | Ding et al. |
| 6,624,762 | B1 | 9/2003 | End, III |
| 6,635,089 | B1 | 10/2003 | Burkett et al. |
| 6,662,185 | B1 | 12/2003 | Stark et al. |
| 6,681,225 | B1 | 1/2004 | Uceda-Sosa et al. |
| 6,684,207 | B1 | 1/2004 | Greenfield et al. |
| 6,691,109 | B2 | 2/2004 | Bjornson et al. |
| 6,704,729 | B1 | 3/2004 | Klein et al. |
| 6,711,585 | B1 | 3/2004 | Copperman et al. |
| 6,745,194 | B2 | 6/2004 | Burrows |
| 6,748,378 | B1 | 6/2004 | Lavender et al. |
| 6,751,622 | B1 | 6/2004 | Puri et al. |
| 6,760,720 | B1 | 7/2004 | De Bellis |
| 6,768,995 | B2 | 7/2004 | Thier et al. |
| 6,769,124 | B1 | 7/2004 | Schoening et al. |
| 6,799,184 | B2 | 9/2004 | Bhatt et al. |
| 6,804,688 | B2 | 10/2004 | Kobayashi et al. |
| 6,807,541 | B2 | 10/2004 | Bender et al. |
| 6,816,856 | B2 | 11/2004 | Baskins et al. |
| 6,826,556 | B1 | 11/2004 | Miller et al. |
| 6,831,668 | B2 | 12/2004 | Cras et al. |
| 6,868,414 | B2 | 3/2005 | Khanna et al. |
| 6,900,807 | B1 | 5/2005 | Liongosari et al. |
| 6,920,608 | B1 | 7/2005 | Davis |
| 6,931,401 | B2 | 8/2005 | Gibson et al. |
| 6,952,736 | B1 | 10/2005 | Westbrook |
| 6,965,892 | B1 | 11/2005 | Uceda-Sosa et al. |
| 7,027,052 | B1 | 4/2006 | Thorn et al. |
| 7,228,296 | B2 | 6/2007 | Matsude |
| 2002/0124003 | A1 | 9/2002 | Rajasekaran et al. |
| 2002/0138353 | A1 | 9/2002 | Schreiber et al. |
| 2002/0143735 | A1 | 10/2002 | Ayi et al. |
| 2002/0143783 | A1 | 10/2002 | Bakalash et al. |
| 2002/0188613 | A1 | 12/2002 | Chakraborty et al. |
| 2002/0194173 | A1 | 12/2002 | Bjornson et al. |
| 2003/0009443 | A1 | 1/2003 | Yatviskly |
| 2003/0033279 | A1 | 2/2003 | Gibson et al. |
| 2003/0093424 | A1 | 5/2003 | Chun et al. |
| 2003/0115176 | A1 | 6/2003 | Bobroff et al. |
| 2003/0120651 | A1 | 6/2003 | Bernstein |
| 2003/0204513 | A1 | 10/2003 | Bumbulis |
| 2003/0204515 | A1 | 10/2003 | Shadmon et al. |
| 2003/0217335 | A1 | 11/2003 | Chung et al. |
| 2004/0107186 | A1 | 6/2004 | Najork et al. |
| 2004/0133590 | A1 | 7/2004 | Henderson et al. |
| 2004/0143571 | A1 | 7/2004 | Bjornson et al. |
| 2004/0169654 | A1 | 9/2004 | Walker et al. |
| 2004/0230560 | A1 | 11/2004 | Elza et al. |
| 2004/0249781 | A1 | 12/2004 | Anderson |
| 2005/0015383 | A1 | 1/2005 | Harjanto |
| 2005/0050054 | A1 | 3/2005 | Clark et al. |
| 2005/0060325 | A1 | 3/2005 | Bakalash et al. |
| 2005/0071370 | A1 | 3/2005 | Atschul et al. |
| 2005/0080800 | A1 | 4/2005 | Parupudi et al. |
| 2005/0097108 | A1 | 5/2005 | Wang et al. |
| 2005/0102294 | A1 | 5/2005 | Coldewey |
| 2005/0149503 | A1 | 7/2005 | Raghavachari |
| 2005/0171960 | A1 | 8/2005 | Lomet |
| 2005/0179684 | A1 | 8/2005 | Wallace |
| 2005/0198042 | A1 | 9/2005 | Russell et al. |
| 2005/0262108 | A1 | 11/2005 | Gupta |

FOREIGN PATENT DOCUMENTS

| | | |
|---|---|---|
| WO | WO 95/17783 | 6/1995 |
| WO | WO 99/34307 | 7/1999 |
| WO | WO 01/46834 | 6/2001 |
| WO | W/O 02/063498 | 8/2002 |
| WO | WO 02/063498 | 8/2002 |

OTHER PUBLICATIONS

Daniel Cohen, Introduction to Computer Theory, 1997, John Wiley & Sons, Inc., 2nd Edition, 419-423.*

Xiao et al., Efficient data mining for maximal frequent subtrees, Nov. 19-22, 2003, IEEE, 379-386.*

Lomet., Simple, robust and highly concurrent b-trees with node deletion, Mar. 30-Apr. 2, 2004, IEEE, 18-27.*

Gschia-Yuan Teng & David L. Neuhoff, "An Improved Hierarchical Lossless Text Compression Algritm", Proceedings 1995 Data Compression Conference.

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.

Jeffrey O. Kephart & David M. Chess, "The Vision of Autonomic Computing", T.J. Watson Research Jan. 2003.

Linda Dailey Paulson, "Computer System, Heal Thyself", Aug. 2003.

Dave Gussow, "Headline: IBM-Enterprise Storage Server Shines at Colgate Palmolive", Jan. 6, 2003.

Caroline Humer, "IBM Creates Self-Healing Computer Unit", Jan. 8, 2003.

Burton F. W. et al: "Multiple Generation Text Files Using Overlaping Tree Structures", Computer Journal, Oxford University Press, Surrey, GB. vol. 28, No. 4 Aug. 1985 , pp. 414-416.

* cited by examiner

Original Sample Data Set – Sales Team Activities

Bill Tuesday 100 sold PA
Bill Tuesday 100 sold PA
Bill Tuesday 100 sold PA
Bill Tuesday 100 sold PA
Bill Tuesday 100 sold PA
Bill Monday 103 sold NJ
Bill Monday 100 trial PA
Bill Monday 100 trial PA
Bill Monday 100 trial PA
Tom Monday 100 sold PA
Tom Monday 100 sold PA
Tom Monday 103 trial NJ
Tom Monday 103 trial NJ
Tom Monday 103 trial NJ

Fig. 6

Original Sample Data Set – Inventory

100,BedroomSet,50
103,EntertainmentCenter, 60

Fig. 8

STORING THE REPOSITORY ORIGIN OF DATA INPUTS WITHIN A KNOWLEDGE STORE

FIELD OF THE INVENTION

This invention relates to the field of manipulation of interlocking trees datastores, particularly to identifying multiple data stream inputs within an interlocking trees datastore.

BACKGROUND OF THE INVENTION

We have developed a system and various methods for creating and using interlocking trees datastores. In particular, these structures and methods have been described in patent applications U.S. Ser. Nos. 10/385,421, (now published as US 20040181547 A1) and 10/666,382, by inventor Mazzagatti. Additionally, we described a system in which such interlocking trees datastores could more effectively be used in U.S. Ser. No. 10/879,329. All of these three patent documents are hereby incorporated herein in their respective entireties by this reference to them. While the system and method we describe in this patent relate with particularity to the specific interlocking trees datastores which inventor Mazzagatti hereof described in the above-referenced patent (applications), the system and methods described herein may also be applicable to similar structures.

While the interlocking trees datastores structure created by the system originally described in co-pending patent application U.S. Ser. No. 10/385,421, and the means for the Learn Engine taught in co-pending patent application U.S. Ser. No. 10/879,329 to allow the interlocking trees datastore to accept multiple inputs, provides many useful traits for understanding the inventions described, heretofore there has been a fundamental limit on its usefulness.

As taught by copending application U.S. Ser. No. 10/879,329, the Kstore Learn Engine can accept multiple sources of input such as sales transactions from different registers, or sales transactions from registers and purchase data from inventory, but, in order for the interlocking trees datastore (hereinafter 'Kstore' or 'interlocking trees datastore', or 'K', to be used interchangeably) to distinguish between multiple sources of data input, the associated data source information for the Kstore indicating the source of data input was taught to be stored outside of the Kstore structure. Under certain operating conditions or optimal configurations of the Kstore, such as when there are multiple types of data sources, it may be important that the distinction between the origins of individual data items be included within the knowledge of the Kstore data structure.

Given that the data structure did not exist prior to the teaching of the applications lists above, there did not exist a solution for including the knowledge of the sources of data within the Kstore structure as taught by the prior art. Accordingly, a new method of identifying the sources of multiple data sources within the Kstore data structure was designed. Therefore, the ability to include the distinction between multiple data sources in the Kstore was unavailable prior to this invention.

It should be clear that a single KStore data structure may contain data from multiple sources. If the data from the different sources is the same, for example sales transaction records from different cash registers in the same store, there may be no problem in determining any knowledge one might want from the data. If however the data from each source is different, for example sales transaction data from cash registers and product purchase data from inventory, or, if one wants to distinguish which data stream came from which cash register, it may be important that the distinction between the origins of individual data items be included in the knowledge of the KStore data structure in order to interpret the data when later querying the KStore.

For purposes of definition for this document, a data stream is considered all input from a data source, and preferably it will be sequential input of data from a data source. A sequence within such a stream may be a record, consisting of field variables and delimiters, or a sequence can be a text of a book if the stream is a library of books, or a sequence could be an image file in a portfolio of image files, or a sequence could be a tune in a jukebox. Generally we refer to sequences as records in a data stream but they could be any convenient segment of the data stream.

SUMMARY OF THE INVENTION

If we want later to recover or rediscover the distinction between records put into an interlocking trees datastore or KStore from a plurality or multiplicity of data sources, the knowledge of the data source context must be integrated into the KStore structure.

There can be many ways to accomplish this, but preferably these ways would indicate to the learn function that the data source identification is important, and if we are using the learn engine, use the learn engine function to add an additional field to the data stream from which the KStore being built. This new field may contain a data source name or filename, thus indicating the source for each datum of each record. This will create at least one node in the KStore data structure that will allow the KStore data structure to be constrained to the set of records from that source or repository only.

This at least one new node that would be useful to identify the data source, would typically be the first field in a record, but could be placed at any location in the record, or in any data stream. In the non-field-record universe this may be the first node in a BOT to EOT path containing perhaps text data or perhaps a node in a path that contains metadata about a set of related paths.

In order to distinguish between the origins of individual data items to be included in the knowledge of the Kstore data structure, in the preferred embodiment of the invention, the Learn Function, upon input by the applications developer that it is desired to have the source of data contained in the Kstore data structure, would create an additional field to each record containing the data source or filename, thereby creating an additional node in the Kstore data structure. This is accomplished in the same way as is the experience of any new particle by the KStore via the learning process. In order to fully describe the value of identifying and storing the origin of data inputs into the Kstore for one not versed in the above cited applications, a brief description of the preferred embodiment interlocking trees datastores may be necessary.

As is described in earlier patents on the preferred interlocking trees datastore, each level of the tree-based datastore comprises a first tree that depends from a first root node and may include a plurality of branches. The first root may represent a concept, such as but not limited to, a level begin indicator. Each of the branches of the first tree ends in a leaf node or end product node. A second root of the same level of the tree-based datastore is linked to each leaf node of the first tree that represents an end product. Hence, the second root is essentially a root to an inverted order of the first tree or subset of the first tree, but the first tree is not duplicated. The second root may represent a concept, such as but not limited to, a level end indicator. Finally, the tree-based datastore comprises a plurality of trees in which the root node of each of these trees may include data such as a dataset element or a representation of a dataset element. This type of root node is referred to herein as an elemental root node. The elemental root node of each of these trees may be linked to one or more nodes in one or more branches of the unduplicated first tree. The non-root nodes of the tree-based datastore essentially contain only pointers to other nodes in the tree-based datastore, and may contain additional fields wherein one such additional field may be a count field. The roots of the trees in the forest of trees comprising each level of the tree-based datastore are also comprised of pointers, however the root nodes may, in addition, contain data that represents information (i.e., contain data that is or represents data such as dataset elements or concepts such as level begin or level end indicators); all the other nodes of the tree-based datastore only point to other nodes and contain essentially no data. In one embodiment the data is an integer that is associated with a character, a pixel representation, a condition such as begin indicator, end indicator, beginning of field indicator or the like, although the invention is not so limited. Multiple levels of the above-described tree-based datastore may be generated and accessed; the end products of a lower level becoming the elemental root nodes of the next level.

The KStore structure as described previously will contain nodes representing sequences of events from a data stream. Typically a data stream does not contain information about its source. Therefore, when receiving data from multiple data sources, it should be seen that the Kstore data structure would not contain any indication of the origin of the data that created it.

An effective means for building an interlocking trees datastore from multiple data sources that contained within the datastore the knowledge of the origin of the data was needed, and is thus described herein. Should it be desired or necessary to identify the different sources of data within the Kstore data structure, the present invention teaches how an additional field for the origin of the data is created, how the origin of the data is stored in that newly created field, and how the interlocking trees data store takes that field and creates nodes within the structure, therefore embedding the origin information within the knowledge contained in the Kstore data structure.

A single Kstore data structure may contain data from multiple sources. If the data from the different sources is the same, for example sales transaction records from different cash registers in the same store, there may be no problem. If, however, the data from each source is different, for example sales transaction data from cash registers and product purchase data from inventory, it may be important that the distinction between the origins of individual data items be included in the knowledge of the Kstore data structure.

If data from multiple sources is experienced by the Kstore for the first time, the previous means used by the Kstore Engine would instantiate nodes comprised of the node information described above: fields for the Case, the Result, the asCase list pointer, the asResult list pointer and any additional fields including at least a count field in most forms of the structure; and it would do this for each field value in the record. If data records from one instance of a data source contain data composed in whole or part of the same data and type but from another instance of a data source, (e.g., a different data source) when a node previously created will be traversed when the other data source is experienced by the Kstore, as described by copending applications, the K Engine will increment the node count that was traversed. As an example, using the two data sources described above, cash register and product purchase from inventory, 100 from the cash register data may indicate the sale of a piece of clothing identified by item number 100, whereas 100 from the product purchase may indicate that a piece of clothing identified by item number 100 is in inventory. If the user was to attempt to retrieve statistical data relating to clothing identified by item number 100, the inventory data and the sold data would both be included in the count of clothing item number 100, creating potentially erroneous or misleading results.

It is worth noting here that we can have multiple levels of source data. Using the example in the last paragraph, assume that the sales records come in from several cash registers. In this situation, we may want to know which cash register rang up which sales, but we would be unable to do that without some kind of source identifier somehow fit into the KStore.

To recover the distinction between the records from each data source, the knowledge of the data source context must be integrated into the Kstore structure. As the preferred embodiment to accomplish this, the application developer would indicate to the learn function that the data source is important or integral to the knowledge contained within the Kstore structure and have the learn function add an additional field to each record. The data source name or filename would be stored in the additional field. Although the preferred embodiment is to add the field at the beginning of the current record fields, it should be appreciated that the field can be placed at any location in the current record fields.

By recording the origin of the data within the Kstore data structure, the Kstore structure more completely represents the data knowledge. For example, the variable counts include all the instances of a variable across the multiple data sets. In order to find the variable count for a single data source, for example inventory, the data set would be constrained to just the inventory records and the variable count would be calculated from just those records.

BRIEF DESCRIPTION OF DRAWINGS

The foregoing summary, as well as the following detailed description of embodiments of the invention, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 6 is a sample data set sales team activities to be received by a Kstore structure;

FIG. 8 is a chart of an inventory data set;

DETAILED DESCRIPTION OF PREFERRED EMBODIMENTS

Figure 1:
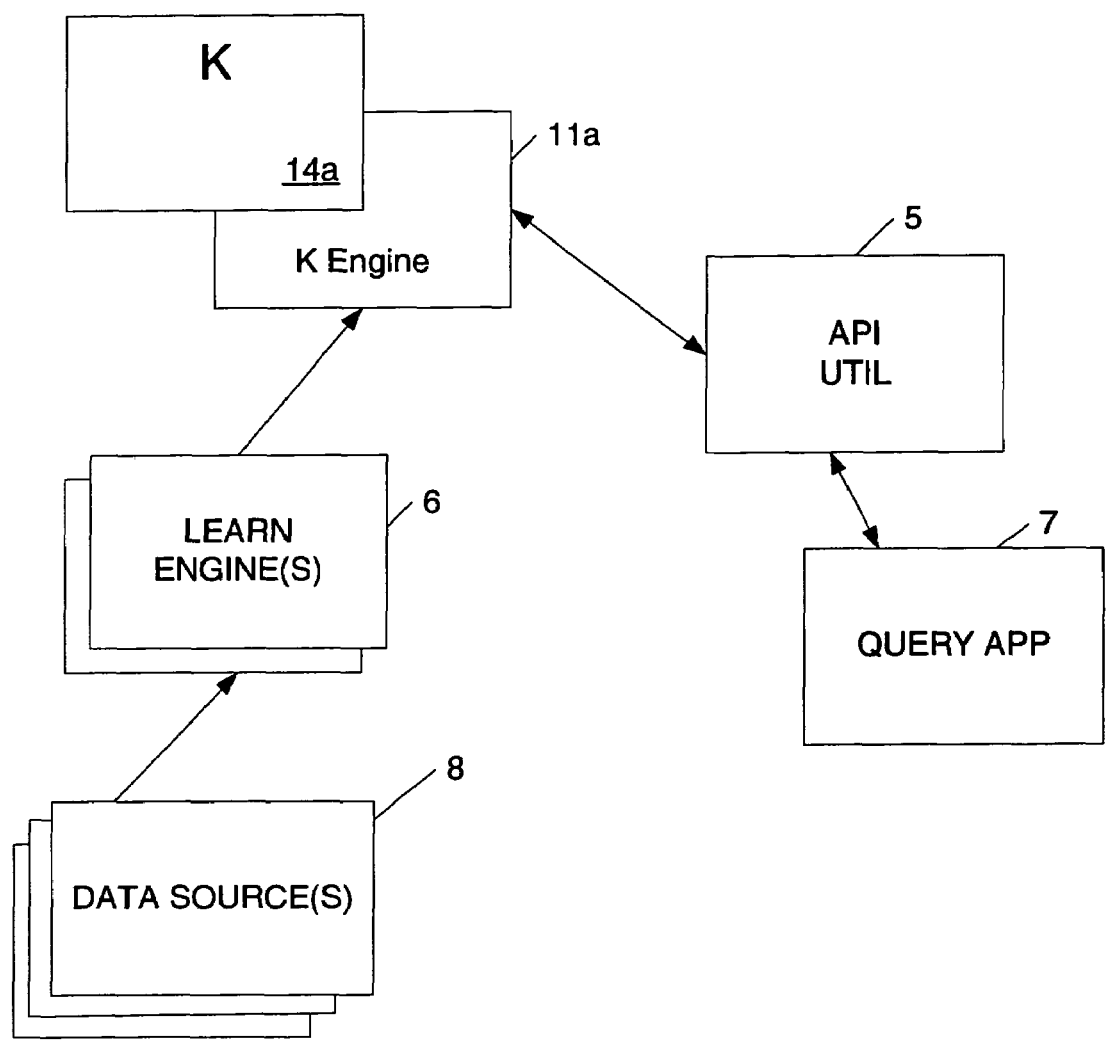
FIG. 1 is a block diagram illustrating an exemplary computing system in which aspects of the invention may be implemented having an interlocking trees datastore K in a computer memory (memory not shown) and components that support such a K in a system.

FIG. 1 illustrates a KStore 14a in a preferred embodiment environment in which a K Engine provides the only connection of the K 14a to the rest of the world. (It should also be noted that there can be more than one K Engine, similar to the one K Engine 11a in the illustration, providing access to the KStore 14a, although it is easier to see in an illustration using just one. We could also be feeding multiple KStores as well). In turn, the K Engine 11a is addressable by software entities such as API Utilities 5 and Learn Engines 6 (of which there could also be more than one). The Learn Engines and API Utilities manage and handle threads in cooperation with the resources of a computer system (not shown) in which they operate. (Typically, the computer system will be a server although we have used a single Personal Computer in some implementations of K.

The outside world, in our preferred arrangements has access to the KStore itself only through these API Utilities and Learn Engines, which in turn access the KStore through the K Engine. The API Utilities and Learn Engines, are accessed by the outside world through an applications layer. Software applications such as GUIs, databases, and any other type of program or interface which could provide data or request information can be hosted in this applications layer. FIG. 1 illustrates this same structure but is drawn to avoid the explicit delineation of threads and layers, to indicate to the reader that the hosting environment is inherently flexible in its nature. The applications layer will have the various data sources 8 and the query applications 7 that use the just described systems to access and use the KStore 14a. This applications layer can be distributed across the internet or a local network, or local to the computer system in which the K is present.

Figure 2:
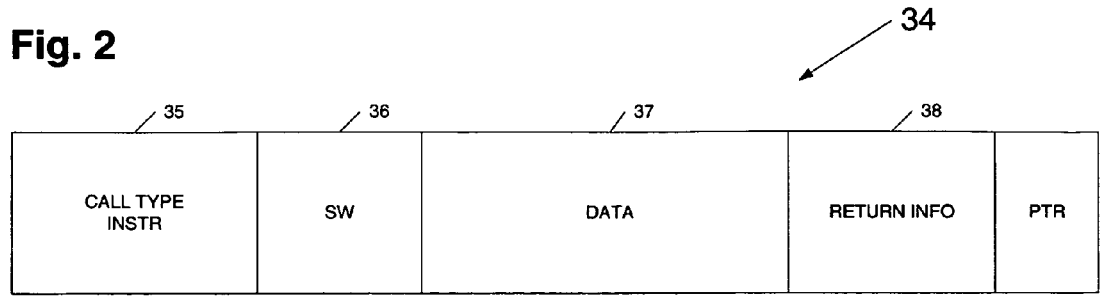
FIG. 2 is a block diagram of a message packet in accordance with a preferred embodiment of the invention.

Calls themselves, that is, the requests from the Learn Engine and API Utility objects to the KEngine can be very simple statements or even instruction words. The quickest way to see this is to illustrate it as an instruction word or message 34 of FIG. 2. As such (we use the concept of the instruction word for purposes of a teaching illustration) the instruction word could have an instruction type (Call) 35, but in most embodiments this is not needed because the K Engine will return a current location pointer regardless of the purpose of the call. The message will preferably have a switch component 36, but in many embodiments, switches can be set for the K Engine elsewhere. The message does require a data particle 37, suitable to be brought into relation within the KStore. By this suitability we mean that the particle must be something the particular KStore can recognize. In other words, if the KStore is only able to understand ASCII text particles and the information in the data particle section 37 of the example data word 34 is not an ASCII character, there will be an inability on the part of the instance of the call handler spawned to learn this particle to accomplish its task, and the call handler should generate an error signal to return to the Learn Engine in such an instance. Likewise, if the API Utility sends a request to find a particle in said ASCII-based KStore that is not in ASCII, an error indicating something like "not found" would preferably issue, responsive to such a request. (A further discussion of particles qua particles, characters, pixels, or other quanta-like components of information is found elsewhere within this document). Still using the instruction word analogy, the message to the K Engine should also have a return address section 38 that indicates the source of the request. This will preferably be generated by the Learn Engine to indicate that the acknowledge or error signal should be returned to it (along with some kind of trace so it knows which particle in a particle stream caused the error). If the call came from an API Utility, the return address section would be used to track where the API Utility got its query from (i.e., from which thread and where among the parts to this thread this call came) and to which this call is a part of the solution. (By part we mean that it may be a focus particle or a constraint particle to be used together to solve the query, or part of some larger query requiring several constraints or foci.) Finally, we should have a pointer 39 included in the instruction word 34. This pointer 39 communicates the current location in the KStore. The first particle in any new KStore will have a null pointer. This null pointer will be interpreted by the K Engine as a call to initialize, i.e., set the current location counter to the BOT node.

The Learn Engine basically provides an interface and translation and particlization functions to enable the K Engine to receive particlized data to learn. Thus it must be able to process appropriate protocol, transport, and translation capabilities to receive input from the expected data sources, whether they are XML, Oracle, DBMS or whatever, whether they are from static or streaming sources or even external event-triggered real-time sensor sources. Of course the particular embodiment may be geared to any subset of such inputs. It needs also to be able to translate the data from such sources into appropriate sized chunks of data that can be readily particlized to fit with the expected data particle formatting of the KStore, and it should have a particlizer to send such particles to the K Engine, and any buffering as appropriate may be added.

Figure 3A:
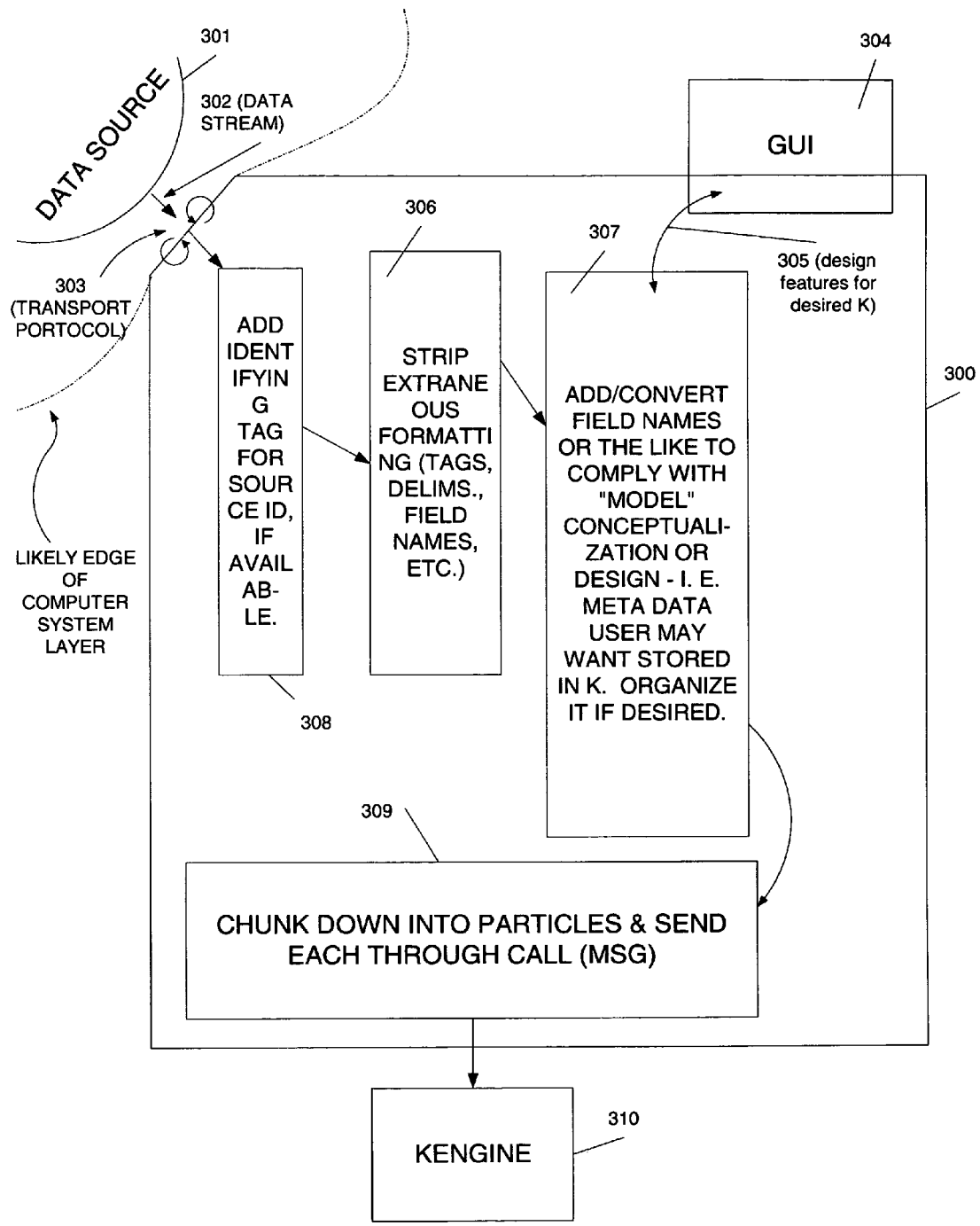
FIGS. 3A and 3B are a block diagrams illustrating the importation of data into a KStore (not shown) through a KEngine from a data source.

Refer now to FIG. 3A in which a preferred embodiment of a Learn Engine 300 is illustrated, handling a stream of data 302 from a data source 301. The data stream is received through a transport mechanism with associated protocol, in most cases probably from an external source computer system (not shown), across a communications medium (not shown) such as the internet or a local network to the computer system (also not shown) in which the Learn Engine 300 and the K Engine 310 as well as the KStore data structure (not shown), are functioning.

Assuming we are using the current invention, as a first step or matter, we preferably use component 308 to append some kind of ID onto the information coming from the source identifying the source. There are various ways to do this as would be understood by those in these arts, but generally, we merely need to assign (or receive and associate) a unique name or ID to this stream of incoming data.

In a component 306, the Learn Engine will remove any extraneous formatting and protocol artifacts, and any tags, delimiters, and field names that are not relevant to the KStore being built with the data from the data stream 302.

Subsequently, the incoming data will be subject in component 307 to a review of all Meta data about it that exists within the stream. In the case of the field record data stream of a preferred embodiment, fields that the developer desires to keep identified will keep their associated metadata in a positional relationship to the data within them that the developer has come to expect or want for this KStore. If a field name from a previous data stream that is going to be associated in the KStore with this new data stream came from a different database with different field names, the names may be changed at this stage in this component 307. Likewise, if a different kind of database was used in the creation of the KStore using the earlier data stream, the field name may come after rather than before the data in the other database, for example, so this arrangement should be mimicked at this component in order to regularize the data. There are alternatives such as creating a related structure within the same KStore by ignoring the differences, but it seems at this point to be efficacious to regularize the data streams, or, in other words, clean the data. Control over this data cleaning or regularization will preferably be obtained through a GUI 304, wherein design features that are desired 305 are conveyed to the component 307.

Next, a final component 309 in the Learn Engine need only break the data into particles with appropriate pointers indicating what kind of particle it is, and to pass this particle itself, together with the other message features i.e. the current location pointer, needed to the K Engine 310 in the form of a call.

As should be apparent by this point, and well understood by readers in these fields of endeavor, each of these functions and components can be distributed across the computer systems and networks as desirable to effect the most useful form for the particular application the applications developer may be building or use to which the KStore will be put.

Figure 4:
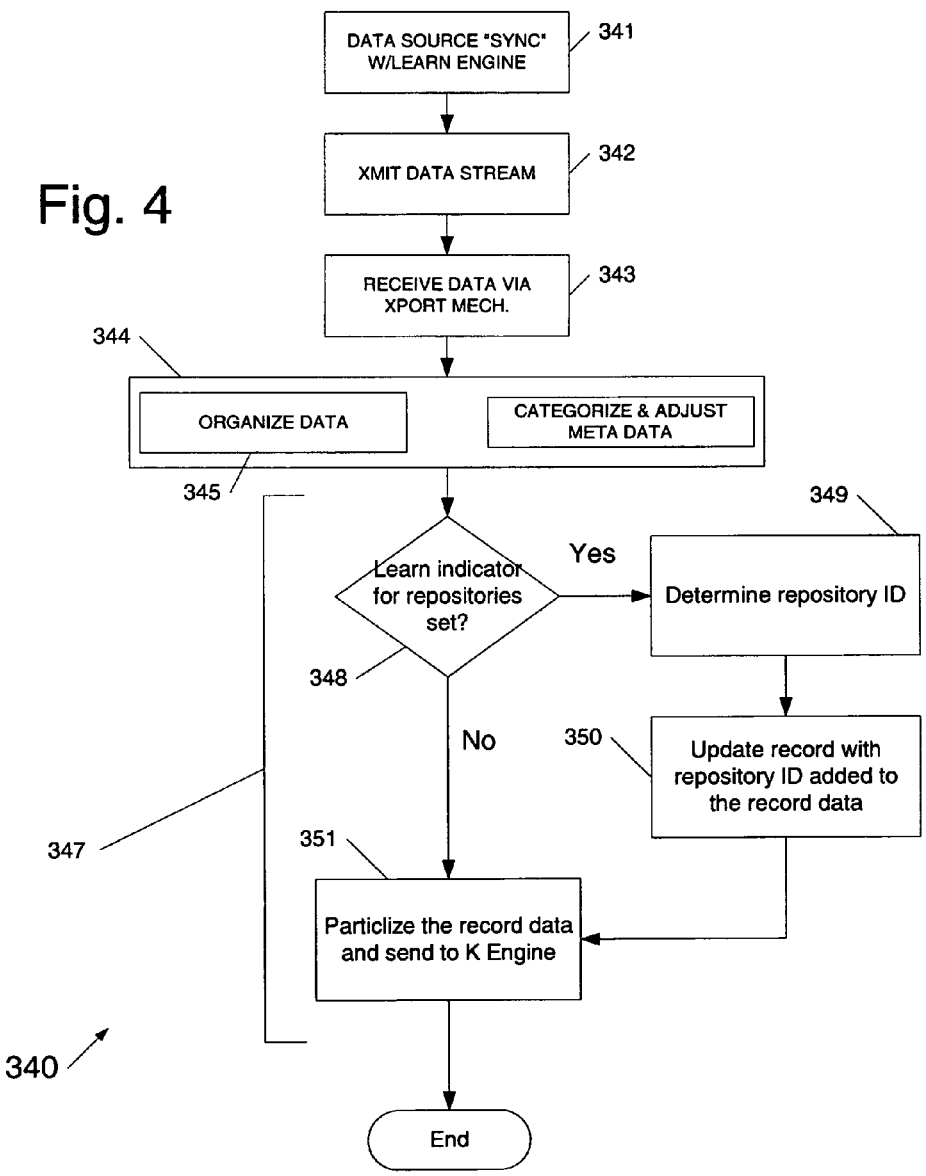
FIG. 4 is a block diagram of a process performed in the components of FIG. 3.

Referring to FIG. 4, the generalized process 340 by which the Learn Engine functions is illustrated in flow chart form. First the data source is synchronized 341 with the Learn Engine. Various protocol functions, establishing a transport mechanism, security features and the like are handled during this phase. As should be well understood by those of skill in the programming arts, one would prefer to have a mechanism for establishing the protocol for communications between the data source and the Learn Engine to allow the communications between the Learn engine and the data source to occur smoothly. Such a subcomponent would have signaling functions that would be established so that the data could flow into the Learn Engine from the data source, preferably without interruption. Once protocol for synchronization of communications is established, the data can be transmitted in a data stream 342. At this point the data can be received 343 through the established transport mechanism. It is at this point that the Learn Engine's functions relating to establishing appropriate data messages for the K Engine occur in step 344. In this phase 344, the data is organized into the format that the K will learn it 345, including any source identifier there may have been when the connection to this data source was made. The source identifier data can of course be managed within the Learn Engine, to the point where it assigns an ID of its own manufacture, or it can simply use the source ID given by the source. This will be a matter of how many sources are expected to be used and their nature as to how this function is accomplished. The other metadata as well as delimiters and other protocol or metadata features will be adjusted as needed in block 346. At this point the data stream is ready for particlization 347. It should be noted that delimiters and other metadata such as the data stream source, field headers, record number indicators and the like ordinarily will be particlized as well for the field/record universe of data streams. This permits knowledge of the structure of the original data to be learned along with the data. Such particlization in this form is preferred but not required. Generally it will be understood that the data storage of the server system will be used to hold the incoming data stream as it is handled and/or reorganized for particlization by the Learn Engine.

The particlization process 347 can be seen to be a series of steps first asking if there is some indication 348 that repository identifiers will be included in the data stream. If so, they will be included visa steps 349 and 350. If not, the data sequences from that source will not include the source identifier, and particlization of the data stream will occur. In either circumstance, the particlization occurs 351 by breaking down the data stream into its sensor-level data and sending each one to the K Engine.

It may be noted that in order to efficiently process new particles, particularly for establishing tables, where there are branches from particular nodes, the Learn Engine may submit location pointers for a previous to last position as the last position when it is creating a next message for the call with the next particle. To see this, look at FIG. 8. At the node labeled Bill Monday, there are two subcomponent nodes which follow it, using Bill Monday as Case definitions. They append either 103 or 100 nodes. This is called a branch.

Figure 12:
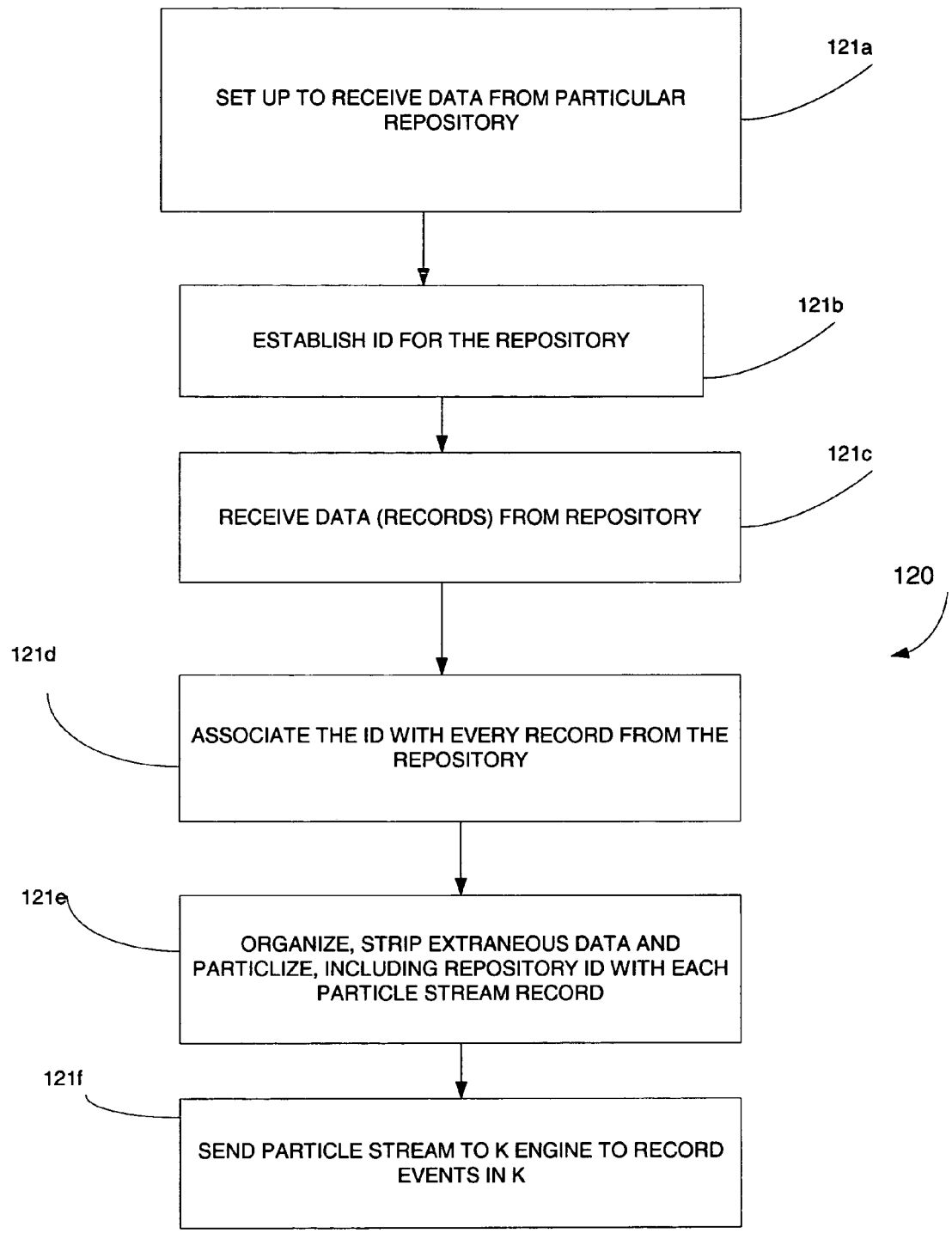
FIG. 12 is a flow chart for discussion of particlization.

To be clear about particlization refer to FIG. 12. Note that in this K, it starts at a level of letters, and shows a second level of words. If all letters are "sensors" that is, they can be recognized as particles, adding each new letter allows for continued growth of the K. Submission by a data source would be by way of the three words in order, "CATS" "ARE" "FURRY". This K accepts letters as particles. Accordingly, the Learn Engine providing an interface to the K Engine for this K must produce letters as particles. A first particle is "C." The node representing this particle will be located within the elemental root nodes. To record this as an event the elemental root node for "C" will be brought into relation with the current location pointer in K, which in this case is the BOT (Beginning Of Thought) node. Because this is the first occurrence of "C", a new node will be created representing BOT-C. The next particle will be A, and it will be accompanied by a pointer to the BOT-C node. The K Engine will go through the asCase list and for each of the subcomponent nodes on the asCase list of the BOT-C node and for each node it will look at the Result node to see if it matches and use that subcomponent to reset the current location pointer. In this case there are no nodes in the asCase list and it will not have found a match, so the K Engine will record this event as BOT C-A, a new subcomponent node, and put this new subcomponent node on the asCase list of the original location counter. The new subcomponent's address will then be set as the new current location. More precisely, The K Engine will see that there are no occurrences of A following BOT-C in the current structure and that a new node will be required to record this particle event as BOT C-A. The next particle will be a T, and the record will be the new node presenting BOT C-A-T.

In our preferred embodiment Learn Engines, will reduce the size of data in the input data stream after stripping and adding and/or converting it in order to comply with predetermined information that is available to the Learn Engine through the initial set up processes. The Learn Engine should be established with a set of switches kept in its associated memory area and accessible to a application or application programmer that sets up the Learn Engine's functioning with the KStore and the K Engine it will be working with. These switches will have data regarding the datum sizes that are to be expected from the data sources it will be working with. This can also be handled in the protocol establishing step. In any event, the purpose of such activity is to end up with the size of the particle matched to said predetermined sensor information that the K Engine and the KStore it is working with will accept.

In preferred embodiments, we have two types of API Utility components to the typical KStore system. One, an administrative API Utility component, is for maintenance, initiation, and change function support, which enables the application developer or a program to modify the various system components such as, by setting switches, state variables, designating data sources, modifying metadata or doing other things of an administrative nature. These settings that may for example control the functioning of a K Engine responsive to particles that may be on its sensor list. One such example could be designating certain particles as delimiters where a K Engine is expected to be responsive to a Field/Record universe of data. They may enable the application developer to initiate a second K Engine for accessing a single or more than one KStore within the system. Another function that may be handled in this way is the establishment of form and meaning for metadata in an input data stream or in a set of queries from particular query sources. This administrative API Utility type may be used to name particular KStores, to save them to long term storage, to return them to active system memory, in short, to accomplish any function other than the actual particle by particle message passing call operations of the system or query resolution. An illustration of a preferred embodiment of this administrative API Utility is pictured in FIG. 5. The other API Utility type is used for queries, and is not illustrated.

Figure 5:
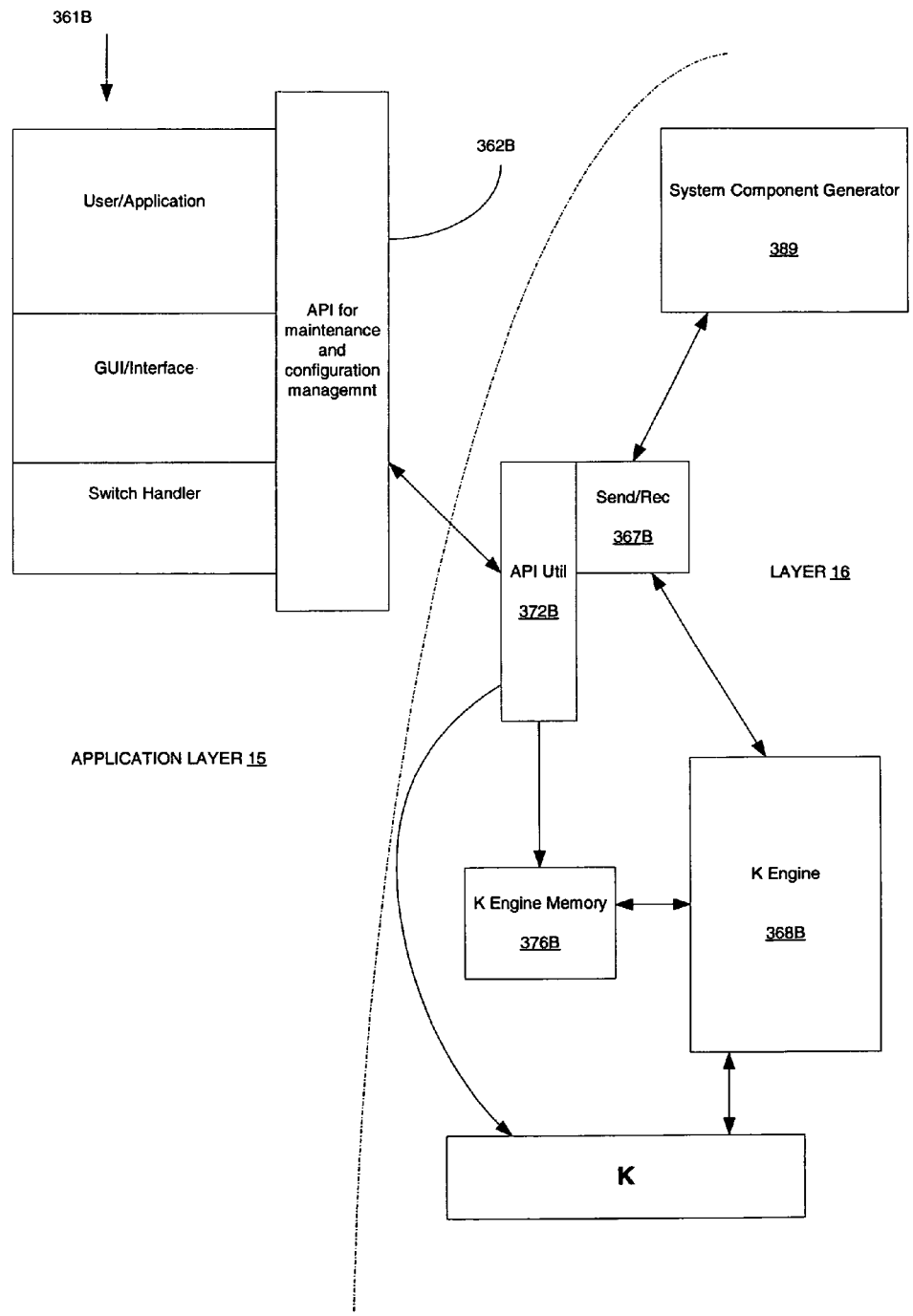
FIG. 5 is a diagram of the components of an API for maintenance and configuration management and its interaction with other components of a preferred embodiment system in which a KStore is functionable.

In FIG. 5, the application developer or application that needs to adjust or initiate processing in the KStore system will access the state variables of interest through an interface 361B. In fact, the builder or user of a KStore system we describe here may build nearly any kind of interface structure in the applications layer he wants to. The only critical requirement in the applications layer 16 is that it communicate through an interface such as the API 372B which provides multiple routines to access the KEngine, K Structure and associated memory areas. One would expect that the arrangement of applications layer components would include a Switch Handler which will process these requests as needed, interpreting them appropriately for the system under consideration. For example, if a system is established with some number of different default settings to be set into an instance of a K Engine or K Engine and KStore combination for a given set of threads, a single command through the GUI or other interface may be used to choose the default most appropriate for the user's or the application's needs. Thus, the application will handle communication of this set of state variables to the API Utility segment 372B, which will make appropriate changes in the state variables and the like in the K Engine memory 376B or in K (and/or in K's associated state memory, not shown).

Additionally, it should be noted that the administrative routines of the API Utility of FIG. 5 will also (preferably) be called upon to instantiate the K Engine and set up the basic parameters used in the one or more KStores and that this K Engine instantiation will be called upon to build and/or access the K structure. The Utility segment together with the send/receive subcomponent will have the addresses and other information needed to contact a K Engine instantiator object, here illustrated as a System Component Generator 389. In this instantiation process, metadata such as what data in a particle is to be defined and operate as a delimiter, whether the Learn switch is to be on or off, and every relevant configuration variable will be established. Additionally, how to name data stream sources will preferably be handled through such an interface. As there are a vast number of ways to do this kind of configuration management, after the understanding of the KStore system conveyed herein, the reader of ordinary skill in the programming arts will be able to put such ways into effect without undue experimentation and with relatively little programming effort or thought.

In FIG. 6 we illustrate a data set of fifteen records from two salesmen, Bill and Tom, covering something (100 or 103) that was either sold or subject to a trial in PA or NJ on Monday or Tuesday. It is a rather small sample of the kind of data one finds in Field Record universes of data sets, but it is adequate to use to explain our invention.

Figure 7:
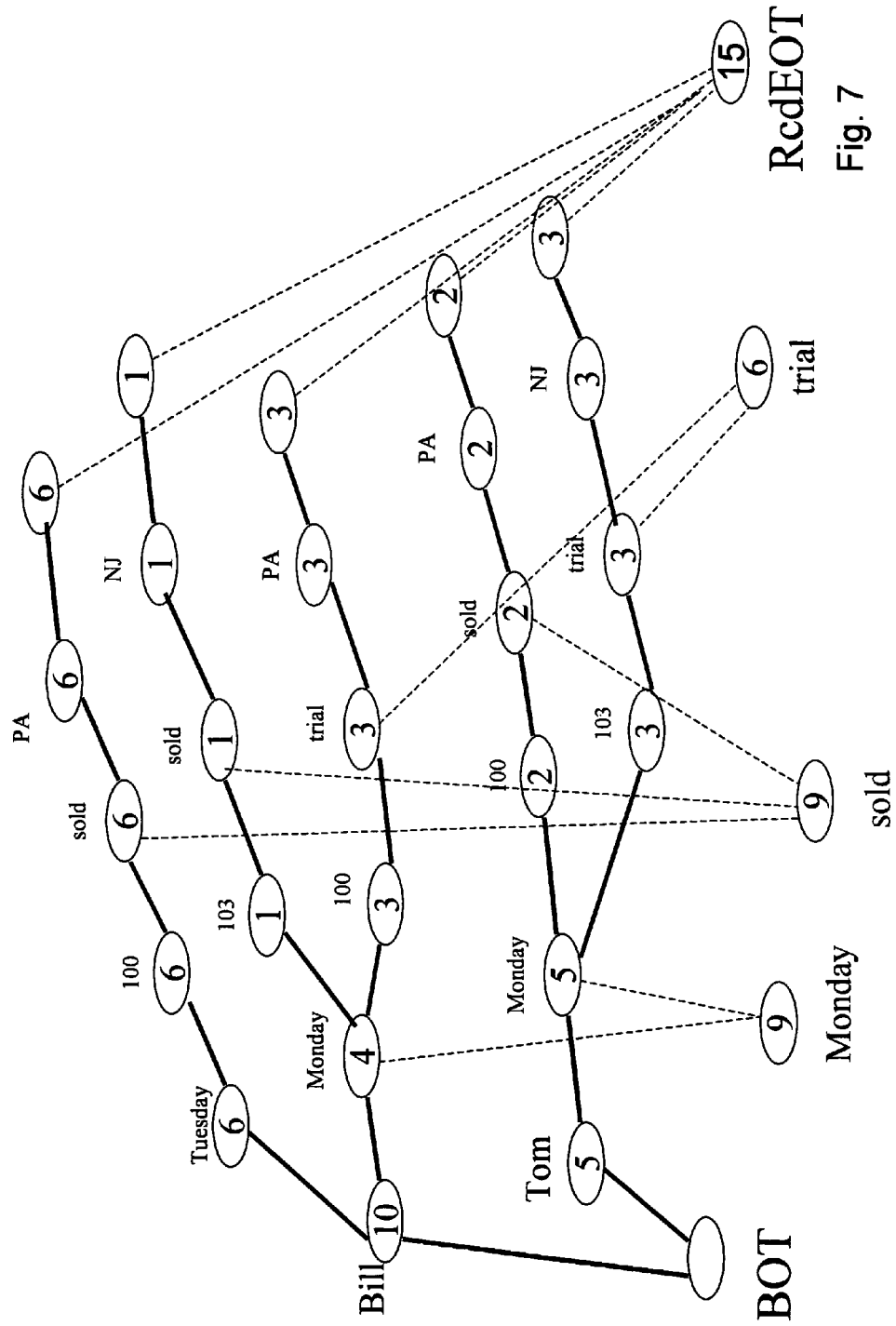
FIG. 7 is a node diagram of a KStore built from the data of FIG. 6.

When fed through a KStore K Engine as illustrated in FIG. 1, this set of records will be represented in a KStore (or "K") in a way that comports with the diagram of FIG. 7. The asCase links from the node (illustrated by an oval) at BOT point to Bill and Tom, each of their nodes containing a count 10, and 5, respectively, that indicates how many records there are of Bill and Tom, again, respectively. There are 9 Monday records, and a root node "Monday" has that value in its count field, illustrated here by the number in its oval. As seen in the count field of the record node RcdEOT (end of record node) there are a total of 15 records in this diagram.

As will be familiar to those who have seen KStore interlocking trees datastores before, these diagrams will be familiar. They have a pointer from each node to a next node in the asCase (BOT to EOT direction) and a pointer from each node to the asResult node (i.e. to its root node), thus the KEngine forms a set of trees from the asCase and from the asResult sides which are interlocking. We have detailed how this is accomplished in earlier filed patents which we identified in the background section hereof, but no further information is needed to understand this invention than this brief description for the native structure of a K.

Figure 16:
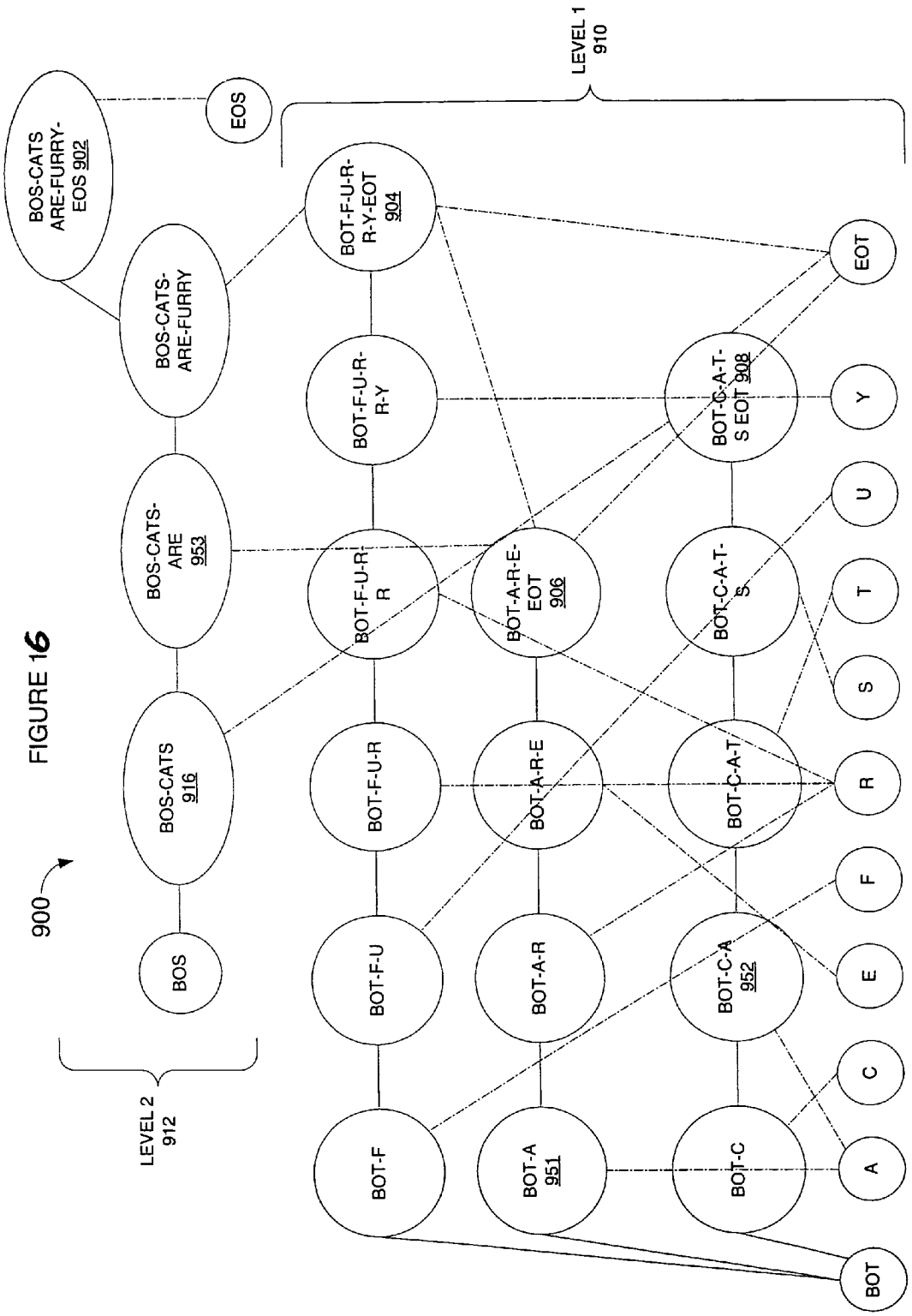
FIG. 16 is a node diagram of a KStore structure useful for discussion of particlization.

The nodes in the structure will typically have a form as illustrated in FIG. 16 which illustrates the data fields of a typical node 30.

This node 30 may include a string field, as the additional field 31, that contains a sequence that shows all of the elemental root nodes represented by this node. The addition of a string field including this sequence of elementals is helpful in debugging. There can be many uses for such additional fields and the nodes such as node 30 need not be limited to one additional field.

Further, recognize that the pointer to asResult list field 3 will be null for all subcomponent nodes and that the pointer to asCase List will be null for the elemental nodes and endproduct nodes.

The exemplary node 30 may also include a count field as an additional field 31. The count field is initialized and incremented with an intensity variable, whose value varies with conditions at times when the count field is being referenced. (An intensity variable is defined as a mathematical entity holding at least one unchangeable value). By making this term so broad the intensity variable populated count field can be used for applications of the inventive interlocking trees structure to processes dealing with forgetting erroneous recorded data, recording which entity is doing the inquiry, recording the type of inquiry being used, and other processes of interest which may be derived when using the data. A simple example form of an intensity variable would be a single ordinal field value, such as '1' to be used to increment or decrement count fields to record the number of times that a node has been accessed or traversed. If the node were an elemental root node it would also contain a value field 32. Most of this node construction is already discussed in prior applications U.S. Ser. Nos. 10/666,382 and 10/385,421, incorporated by reference above.

Figure 9:
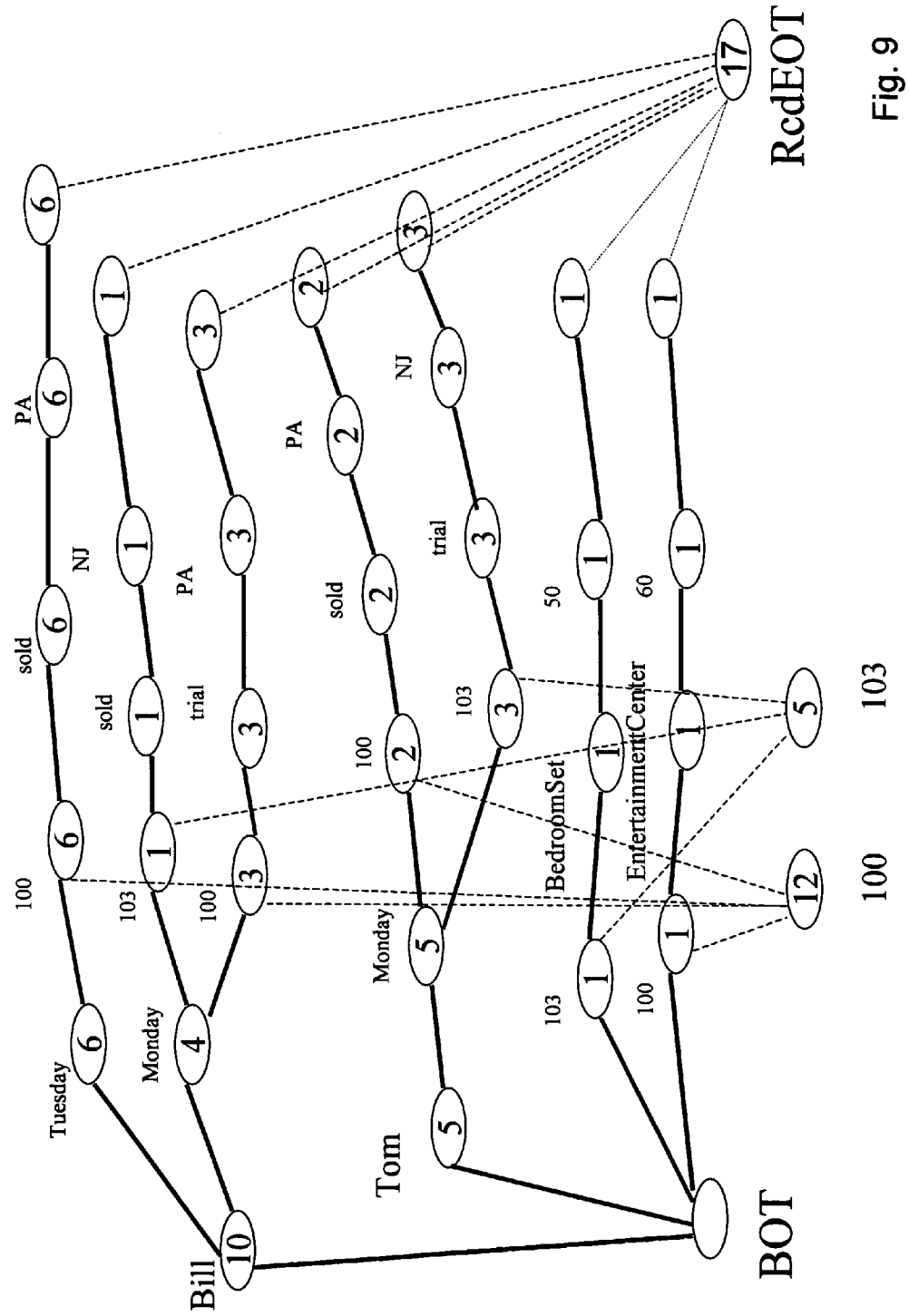
FIG. 9 is a node diagram of a KStore built from the data sets of both FIGS. 6 and 8.

A second data set is provided in FIG. 9. It identifies an item number, a text representation of that item, and an amount in stock number as a record. There are two records in this data set.

It may seem counterintuitive to be able to simply meld these two datasets together into a single data structure such as a K, but because of this invention, we can do so without any concern about losing the information or getting confused about the repository from which any datum, particle, or record or sequence originated.

Figure 10:
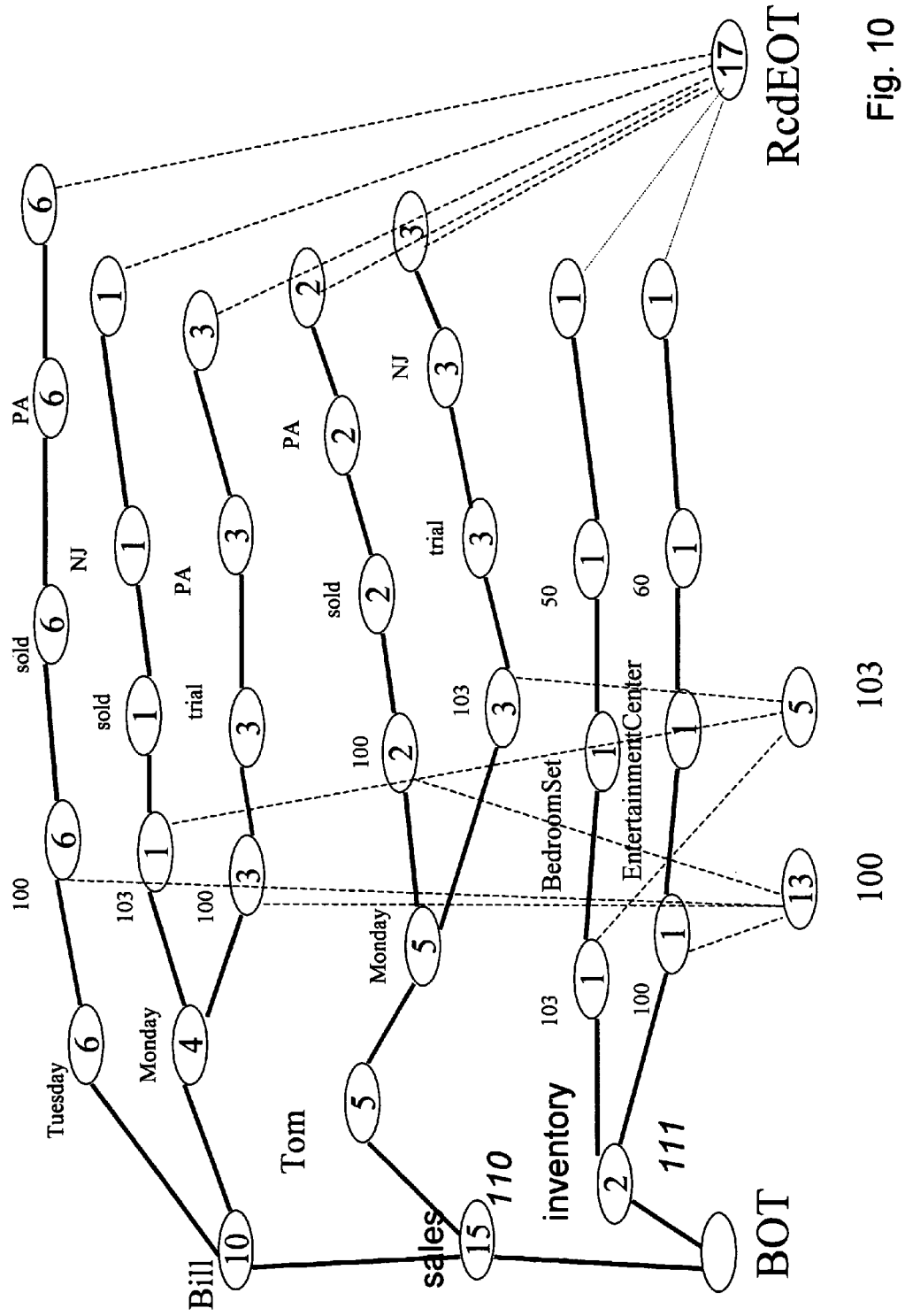
FIG. 10 is a diagram of the Kstore structure developed from the data represented in FIG. 9 employing features of this invention.

FIG. 10 is a node diagram of a K built of that combined dataset. Note that the variables 100, and 103 point to asResult addresses of root nodes 100 and 103, which are item numbers for a stock item in the salesman's records as they also are in the inventory records. Note that there are 50 Entertainment Centers and 60 Kitchen Sets.

Figure 11:
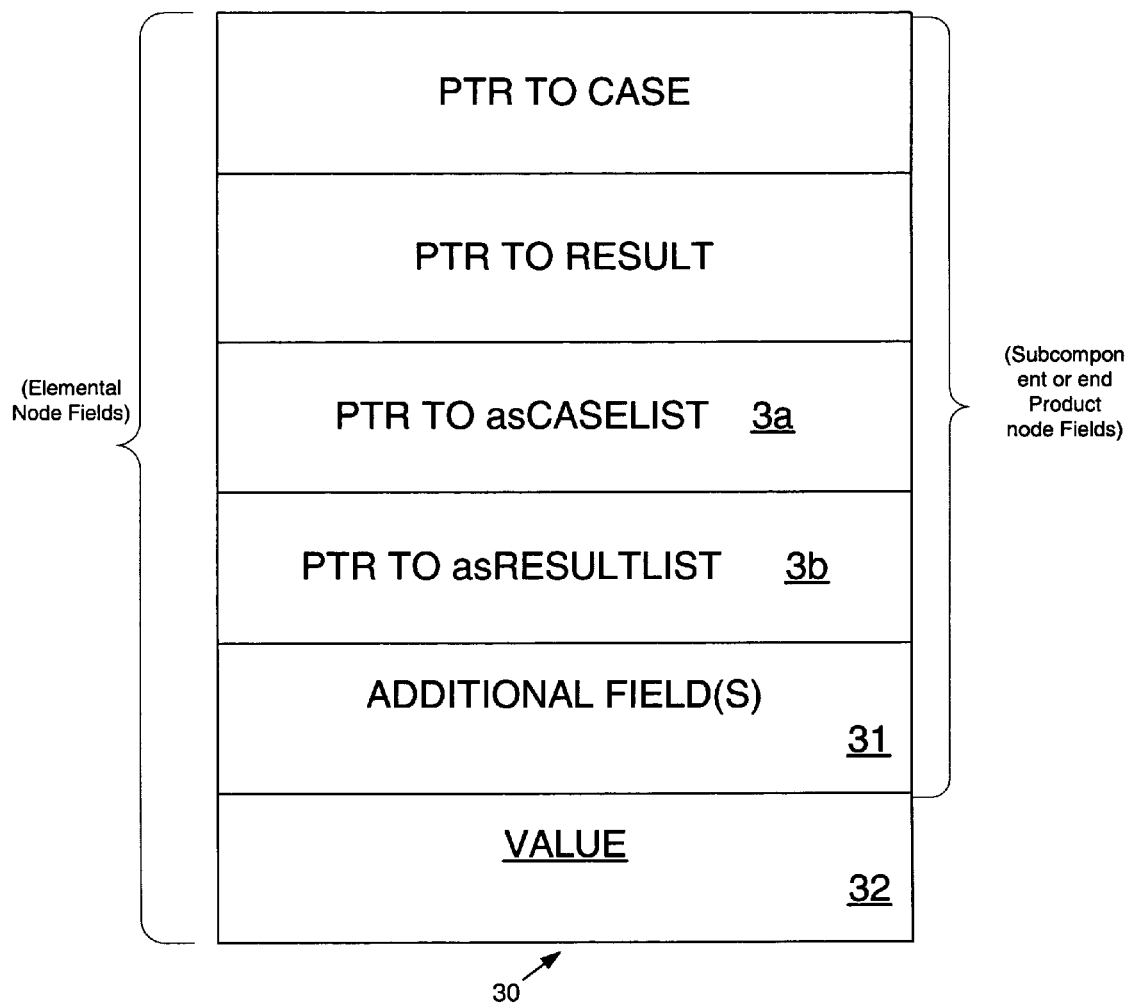
FIG. 11 is a block diagram of a typical node data structure for use in a KStore.

FIG. 11 illustrates in a node diagram form, an implementation of the present invention when applied to the data sets of FIGS. 6 and 9.

In this diagram, note that two nodes are present which distinguish it from the diagram of FIG. 10, nodes 110 and 111, Sales and Inventory, respectively. By this simple addition, any inquiries about the meaning of data in nodes connected through asResult pointers to nodes 112 and 113 can be resolved, because those 100's and 103's in inventory will have case pointers to node 111, and be on the asCase list of BOT through inventory node 111. The other pointers from nodes 111 and 112 will be on the asCase list of BOT through sales node 110, and be pointed to through Case links via Bill or Tom, and Monday or Tuesday. At the same time, one doing a query to find out how many 100's and 103's may be in the K will be able to get the complete number of them across the data source paths, and also know whether they are in an inventory record or in a sales record.

Figure 14:
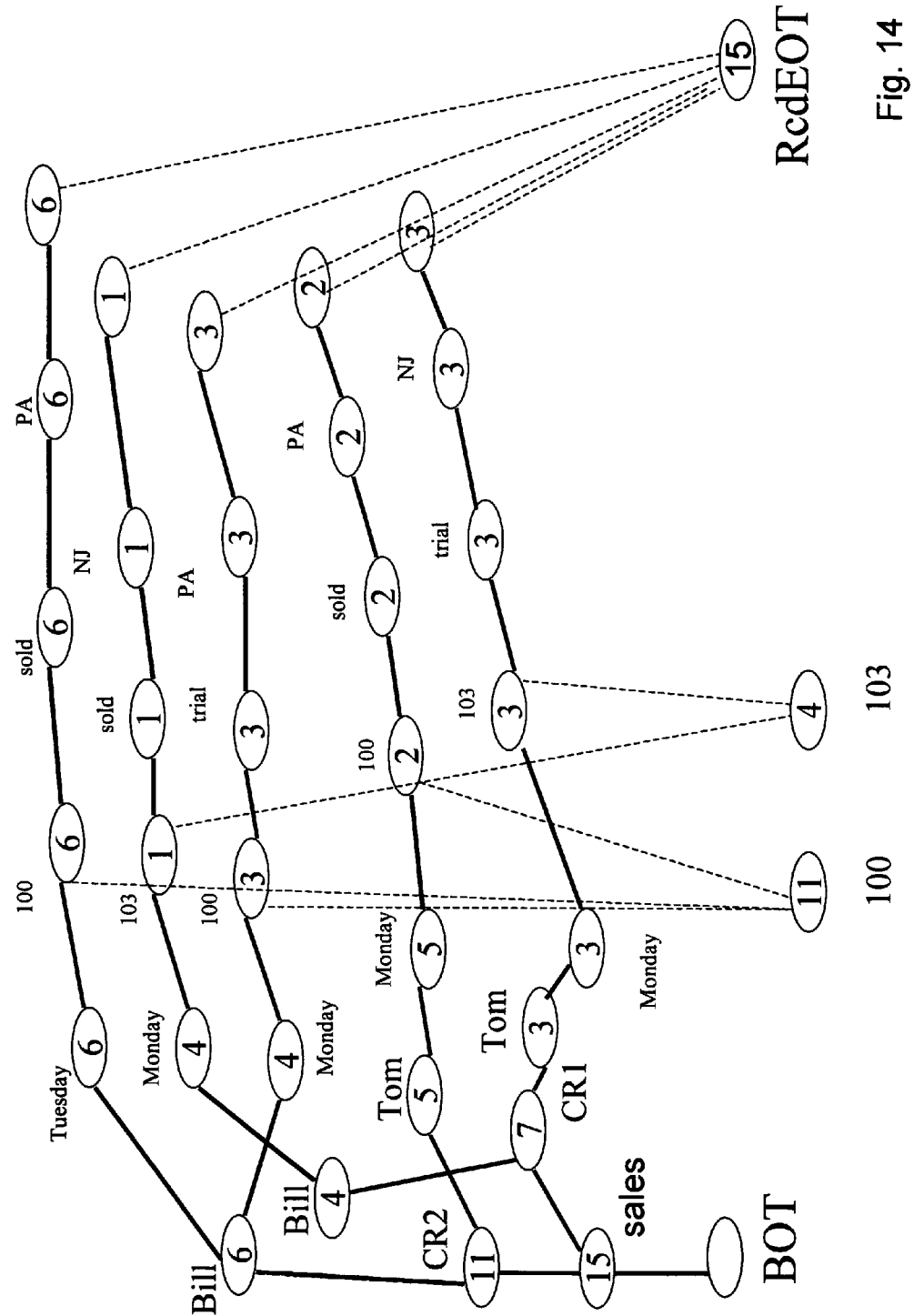
FIG. 14 is a node diagram of a KStore structure illustrating two cash register sources for sales records.
Figure 15:
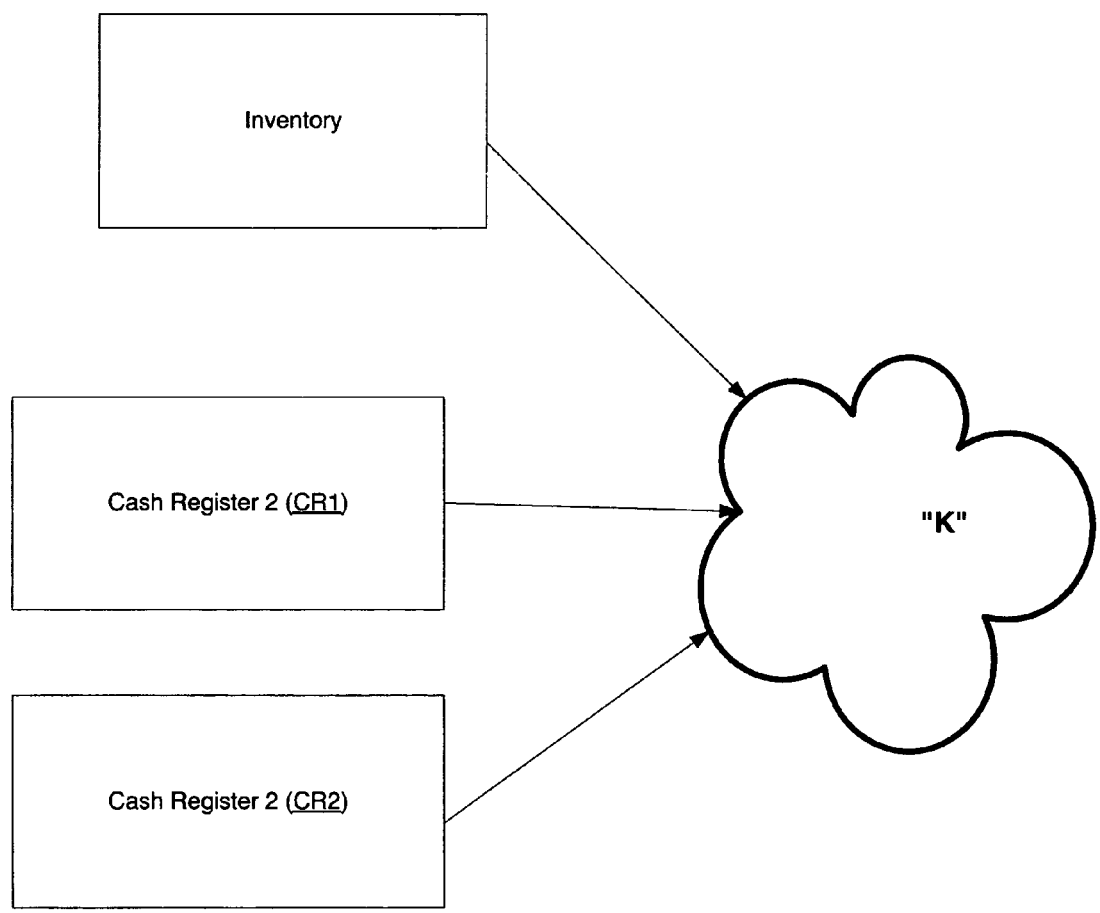
FIG. 15 is a block diagram illustrating a two cash register feed for a KStore to form the diagram of FIG. 14.

In order to clarify the point please refer to FIGS. 14 and 15. In FIG. 15 there are two cash registers CR1 and CR2 which serve as data sources for a KStore, and there is also an Inventory source. Each of these can produce a stream of data for each record it produces. In the node diagram of FIG. 14, we see that the Inventory records have been removed from consideration to simplify the illustration, and accordingly, the total number of records is reduced as indicated by the number in the oval for EOT. Note that because we have added nodes for CR1 and for CR2, we now illustrate additional nodes for Bill and Tom, since some of the activity from each salesman goes through each cash register. The diagram is clearer once you note that CR1 is in New Jersey (NJ) and CR2 is in Pennsylvania (PA). Thus, we can see that the KStore accommodates two levels of source reference. If we added back in the INVENTORY branch of FIG. 10, the diagrams would be very similar, having the same tally in the EOT nodes.

Referring back to FIG. 3A, we now detail the processes of component 308's functioning. There are any number of ways to accomplish the naming of a data source. First, of course, during the handshaking and protocol establishment phases, the source may provide its own name or it can be discovered through the initial filtering of communications from the source. This may be subject to spoofing, so it may be preferred to assign a name for the KStore's use, or establish a routine within the KStore system or Learn Engine to assign the name and track names. This way, if at a later time new data came in from the same source, it may have a different name so the application developer should make a decision that takes this potential into consideration in light of the expected uses. Passwords and various authentication schemes can be used as well, of course. The application developer who sets up the connection could assign a name, or the application that is seeking to put data into a K could assign the name.

It should also be recognized that the Learn Engine could put the assigned name or ID into any part of the KStore, so long as there is some association through pointers to the data from the source repository associated with that name or ID. However, at the present time, we view putting a new node at the start of all records emanating from a particular data repository as most efficient. There could be multiple sets of records from a single repository, and each one could have its own file name if desired. This would be best be handled with another node for the file name.

Figure 3B:
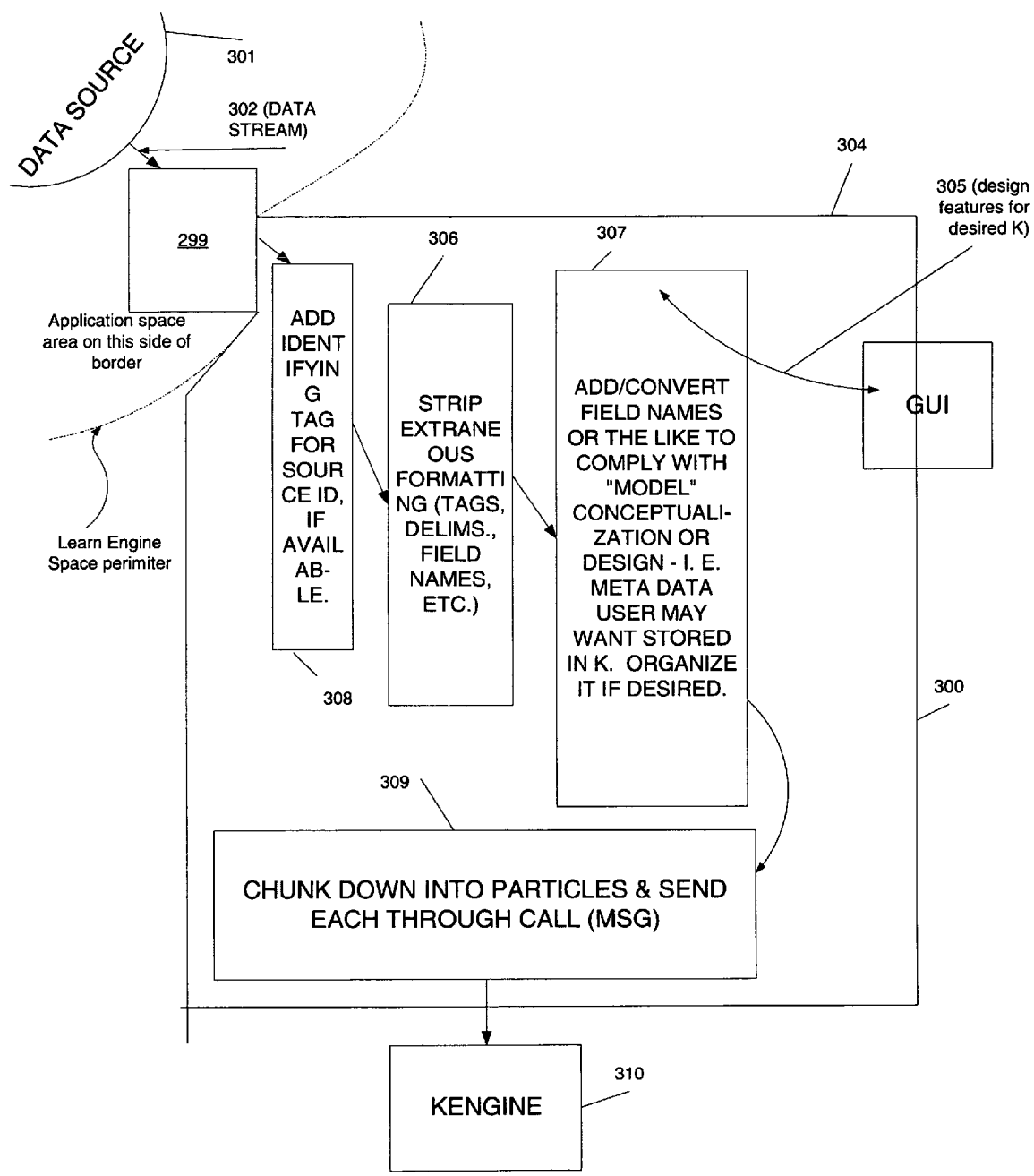

Another preferred embodiment, a variation of the Learn Engine example of FIG. 3A is in FIG. 3B. This figure uses the same numerals for the same structures as does FIG. 3A. However, in this embodiment, we add a component 299 that is outside of the space for the Learn Engine 300. This component 299 receives the data stream 302 from the data source, and it provides an additional layer of flexibility to the system. It may be an ETL (Extract, Transform and Load) component, a filter component or other mechanism to evaluate the incoming data stream and make desired changes to it such as eliminating or modifying certain variables, fields, delimiters or the like, parsing XML into data useful to the particular KStore need identified by a application developer of the component and Learn Engine, and, most importantly for this invention, adding in information about the repository such as a repository ID or another identifier of the repository into the data stream that the component 299 forwards to the Learn Engine 300. Most preferably, the component 299 will incorporate such an ID into each record or sequence received from each source. There may be and preferably is a different value for each repository ID that corresponds to each different data source so that a given data source will have a unique repository ID. The Learn Engine transport protocol would then treat the output from component 299 as output received from a message queue or named pipe. Thus, the ID for the source will be incorporated into each record sequence sent as particles by the Learn Engine into the K Engine 310. Note that the component 299 is in the applications space rather than in the Learn Engine space. This is relevant because it allows for it to be more easily controllable or configurable via applications and application developers. Thus, the configuration as to what data may be desired (or not) from the incoming data stream and how to accept such data, as well as how to organize the data before sending it to the Learn Engine, and the other adaptations we discuss, can be configured by the application, the developer, or the manufacturer or distributor in a predetermined or dynamic way, as may be desired for the given instance.

There are a number of things that can be done using a piece-like component 299. For example, if the external world wanted to time stamp all data sequences it was inputting to the KStore, it could do that in such a component by adding in the time-stamp data. And not just time, but contemporaneous sensor data input could be used to identify for example at what temperature a data record was sent for recording. The flexibility added by the addition of component 299 is quite remarkable, and not just for historical data analysis. If, for example, the KStore was functioning as an intelligence charged with responding to specific conditions, the relevant conditions could be affected by time, temperature, or any other reference data, coincident with the incoming data sequences that happen to have specific data in them that some monitoring device may capture or generate. Another KStore could even be used to supply the appropriate sensor reading. (It is even possible to use the same KStore, through the use of triggers or queries to generate coincident reference data). The KStore would be enabled in this way to know when such conditions are in existence using this component 299 as an integral part of the system.

There are very many potential variations. If, for example we left the field-record universe and assumed that we were getting sensor data, say visual and temperature, the records could correspond through a time node, but each one would start (preferably, but obviously the ID could be in any node in a record) with an ID of Visible Record or Temperature Record, or something meaning that. The resultant K would have both record types in it and one would be able to find information about where they are influenced by the same events in a way one could not do with any other known data storage techniques or structures.

Likewise, a plurality of Learn Engines could operate simultaneously with respect to a single K, and each Learn Engine could supply a source ID for each source it receives data from. This could be supplied with Learn Engine particles send to a K Engine for that single K, without any change in procedure or structure from what we discussed above, although one may want to coordinate the identity indicators for the sources to ensure uniqueness if that is important.

The process can be simply illustrated in a six step (121*a-f*) flow chart 120 as in FIG. 12, beginning with the setting up of the Learn Engine to receive data from a data repository 121*a*. As mentioned this can be done in innumerable ways, but the one feature of importance to this invention is that we determine some identification or ID for the repository, thus establishing 121*b* for the Learn Engine, the ID for the repository.

Assuming appropriate protocol and permissions are received and communication is established, the Learn Engine can begin to receive data from the source 121*c*. As we described above, the Learn Engine is responsible for associating 121*d* the repository ID with the data stream from the repository. It is also responsible for sending whatever format of data is agreed to or identified in the process of setting up the Learn Engine and the KStore using the facilities described with respect to FIG. 5. This process keeps the association of the repository ID as it forms the particle stream 121*e* for sending. The Learn Engine then can send 121*d* particlized information for the ID with the particlized data stream.

It may be useful to describe common memory areas and how the threads operate to get data from the repository to the K. For this discussion refer to FIG. 13.

Figure 13:
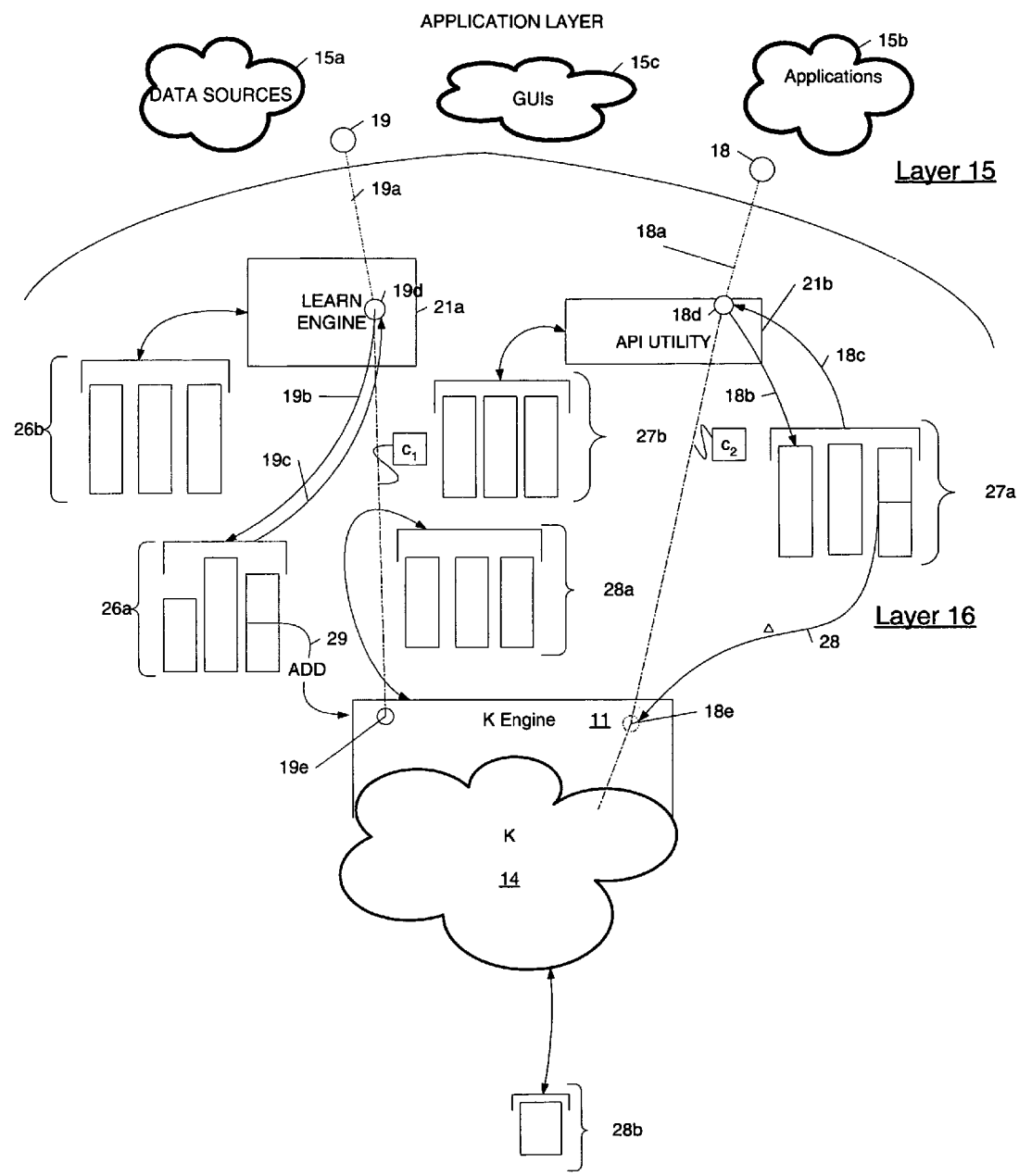
FIG. 13 is a block diagram illustrating various components and their functional relationship within a system for a KStore.

In FIG. 13, layer 16 is a layer that contains at least one instance of API Utilities and/or a Learn Engine 21*b*/21*a*. We can simply call an interface object since for the features shown in this diagram, it functions similarly for both types of interface objects. We describe the functioning of the API Utilities, but are mainly concerned with the Learn Engine functions here. This interface object contains or is the set of programs that enable calls for information or data input 19, 18, to address K regardless of the form they are in. Calls to this object Learn Engine 21*b* or API Utility 21*a*, initiates a thread, threads 19*a* or thread 18*a*, respectively. This thread may supply a continuous or a discontinuous stream of data to the Learn Engine or contain the parameters of a query for the API Utilities. The programs in the software object 21 set up a data storage area 26, 27 in memory (preferably on the server, thus in layer 16) to accommodate the processing needs of the thread 19*a*, 18*a*, respectively. The threads are given "cookies" or keys C1, and C2, respectively, which enable them to access the memory areas. Such access of thread-controlled memory areas is accomplished using reentrant code of the software object 21*a*/21*b* which has routines 19*d*, and 18*d*, respectively. These routines will enable passing address, pointer or other particle-related data to the thread into or out of the data storage areas 26, 27 as the thread executes. Thus, in the case of the Learn Engine, pointer addresses indicating where in a sequence the location pointer is currently for this thread, a list of pointers to all sets of relevant nodes, and information on the ID of the repository from which the data is coming, as well as any other information of that nature are stored and accessed from the memory areas 26 or 27 as the need arises. The data in memory areas 26 and 27 are thus used to drive the activity of the K Engine 11, in that they help the K Engine construct an action to place a new event or find an existing event within K. Based on the result of the activity of the K Engine, the API Utility routines may add data (using reentrant code 19*e* to update the data 29 in data storage area 26, or change some data already in the data storage area 27 (using reentrant code 18*e* with the changes in the data 28)). In other words, we are passing the address of the data storage area around, so we can update the data directly. That's not to say that one could not have a separate piece of code associated with such data transfers/modifications whose sole job is to manage the storage area.

Generally then, the threads are created by the appearance of new data being sent to a Learn Engine or a query asking for results from an API Utility handling such requests. In the case of the Learn Engine 21*a*, managing this thread creation requires the allocation or establishment of memory resources 26*a* and keys or cookies C1 so that the thread will have access to these established memory resources. In the case of the API Utility 21*b*, it will also establish the memory resources 27*a* and keys or cookies C2 to manage the query thread and to guide its operation between the K structure 14 and the K Engine 11. The K Engine will handle the events in the realm of K 14, producing a current location pointer, which can be used by the API Utility to traverse KStore and answer the relevant query or part of query the thread is working on. One of ordinary skill in the programming arts is familiar with the concept of threads and how to have various objects create them in a computer system responsive to program-generated signals and/or data messages and the like, so no further discussion about how to accomplish this using threads is required. Likewise, it will be readily understood by those of ordinary skill in the programming arts that such a set of processes can be created in nearly any modern programming language without any difficulty, and that there are numerous ways to do so.

These memory resources 26*a* and 27*a* allocated to threads 19*a* and 18*a*, respectively, provide places that the Learn Engine and the API Utility can buffer and manage intermediate processing. Such intermediate processing may be needed to satisfy the function of the Learn Engine and the API Utility in supporting the activities of the threads. In the Learn Engine, memory area 26*a* would be used to hold data being particlized as a buffer while the Learn Engine functions to separate and manage each particle as needed. The memory area would also provide space to maintain pointer lists for determining which particle is being sent to the K Engine currently, and the relationship, structure-wise of this event to the data stream being input from the data source, as well as an ability to associate all data from a given source to its repository ID. Lines 19*b* and 19*c* indicate a path between the thread's reentrant code segment 19*d* and the memory area 26*a* which controls the particlizing process, allocating particles and any other needed parts (if any) of the incoming data stream to the memory area. Line 29 facilitates the entry of the Learn Engine's particle data as a part of the message carried to the K Engine by the thread 19a, at section 19e, In here, the K Engine 11 processes the recording of the event in K 14 and returns the current location pointer to the Learn Engine. (Thus, in the drawing, thread 19a may not continue into K itself, unlike thread 18a, which in some circumstances described below can, without going through the K Engine).

The API Utility-related thread 18a would use its memory area 27a to enable the same kinds of functions in a similar manner, supporting thread 18a's activities in making a query, using the resources of the API Utility 21b. Again, a key or cookie (C2) would preferably be provided for the thread to manage its access to the memory area 27a. Again pointer data and data related to the thread's activity, in this case an inquiry of K, are stored in area 27a while the processing of the thread is unfolding. Here, data is returned, in the form of memory location pointers or addresses along line 28 from a piece of reentrant code 18e that the API Utility routine operates with. The management of the memory area, which can be quite complex for a complex query, is handled through reentrant code 18d and communications pathways or messages 18b and 18c.

Note too that in preferred embodiments additional memory areas are allocated for the K engine (area 28a) and for the KStore (K 14) itself (area 28b). Use of such memory areas are preferable to support functions such as switches to determine the various states and conditions for the K Engine and the K structure itself as the API Utility routines determine how to respond to queries or additional data input, whether to learn it or not, and for various features that might be program controlled. For one example, if we have two K Engines, both accessing a single K, the memory area 28b would be used to lock K so that it could learn a new event. For the time K is locked, only the K Engine having access to it (or the part of it that may be locked) can alter that K (or that area of K). Memory area 28a would be needed to store information related to the abilities or configuration of the particular K Engine that uses it. As the reader becomes familiar with use of K and K Engines, additional particular uses for such memory areas may become apparent, but at base, it is most useful to have a dedicated memory region to store each K's state and the state of any universal property switches that may be in use, and a dedicated memory region for each K Engine's state and the states of any properties that will be used by any set of threads.

The methods and system described above may be embodied in the form of program code (i.e., instructions) stored on a computer-readable medium, such as a floppy diskette, CD-ROM, DVD-ROM, DVD-RAM, hard disk drive, memory stick, main memory, or any other machine-readable storage medium, currently known or presently unknown wherein, when the program code, which itself is a set of organized data signals in electronic, optical or other form, is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code may be implemented in a high level programming language, such as, for example, C, C++, or Java. Alternatively, the program code may be implemented in assembly or machine language. In any case, the language may be a compiled or an interpreted language.

It is noted that the foregoing examples have been provided merely for the purpose of explanation and are in no way to be construed as limiting of the present invention. For example, the interlocking trees datastore can be implemented using object-oriented technologies, procedural technologies, a hybrid thereof or any other suitable methodology. Furthermore, although the examples presented show the dataset elements stored in a memory, one of skill in the art will understand that this functionality can be implemented in many different ways. For example, the invention contemplates the use of many different sets of dataset elements of many different universes stored on multiple remotely located machines.

While innumerable uses for this invention may be found, and significant variability in the form and manner of operation of this invention are described and will occur to those of skill in these arts, the invention is not limited in scope further than as set forth in the following claims.

We claim:

1. A method of storing data from a plurality of data sources into an interlocking trees datastore within memory of a computing system comprising a KStore, whereby said sources of data remain distinguishable for each data stream from said plurality of data sources when stored into said interlocking trees datastore, said method comprising:
   receiving a sequence from a stream of data from a first one of said plurality of data sources,
   identifying by associating with said sequence, an identity indicator that indicates from which one of said plurality of sources said sequence originated,
   creating a particle stream based on said sequence and said identity indicator and sending said particle stream to said interlocking trees data store within the memory of the computing system via a K Engine, said interlocking trees data store comprising nodes and non-root nodes organized into a plurality of connected trees, the plurality of connected trees comprising an asCase tree and at least one of a plurality of asResult trees, the asCase tree comprising a first root and at least one of a plurality of non-root nodes, the at least one non-root node comprising a first Case node, and the at least one asResult tree comprising a second root node representing a particle of the particle stream and at least one of a plurality of non-root nodes common with the nodes of the asCase tree, the at least one non-root node common with the nodes of the asCase tree comprising a first Result node, the interlocking trees data store comprising asCase and asResult paths, wherein an asCase path comprises a sequence of sub-component nodes linked with bi-directional asCase links ending with an end-product node and where each sub-component node in the asCase path has a bi-directional asResult link to an elemental root node or end-product node, comprising an asResult path.

2. The method of claim 1 in which said step of identifying by associating an identity indicator with said sequence occurs in an application level component, and wherein a said application level component connects to said first one of said plurality of data sources, comprising:
   data is sent from said first data source to said application level component,
   establishing an identity indicator based on said sent data.

3. The method of claim 2 further comprising after sending data from said first data source to said application level component, identifying in said sent data, said first data source.

4. The method of claim 2 wherein said application level component creates a stream for said Learn Engine from said first data source and in so doing incorporates said identity indicator into data for each sequence from said first data source.

5. The method of claim 4 wherein said application level component is an Extract, Translate and Load or a Filter function component.

6. The method of claim 2 wherein said application level component receives data from said first one of said plurality of data sources in data source sending format and configures it to be in a format that has only the data desired.

7. The method of claim 6 wherein the data desired is determined by an applications developer.

8. The method of claim 6 wherein the data desired is predetermined.

9. The method of claim 2 wherein said application level component removes HTML Tags and delimiters from data from said first one of said plurality of data sources.

10. The method of claim 2 wherein said application level component adds additional coincident reference data to said sequence.

11. The method of claim 10 wherein the additional coincident reference data is a time stamp.

12. The method of claim 10 wherein the additional coincident reference data is supplied by sensor reading from a monitoring device.

13. The method of claim 1 wherein for each data source said step of identifying by associating an identity indicator with said sequence occurs in an application level component, and wherein a said application level component connects to each one of said plurality of data sources, and said method comprises for each data source:
    sending data from said each data source to said application level component,
    establishing an identity indicator for said each source based on said sent data for data from said each source.

14. The method of claim 13 further comprising after sending data from said first data source to said application level component, identifying in said sent data, said first data source.

15. The method of claim 13 wherein said application level component creates a stream for said Learn Engine from said each data source and in so doing incorporates said identity indicator into data for each sequence from said each data source identifying data for each sequence from the particular one of said each data sources from which said each sequence originates.

16. The method of claim 1 wherein said process of identifying by associating an identity indicator with said sequence occurs in a Learn Engine, and wherein said Learn Engine is configured by a application developer directed or by an application directed configuration process in which at least some of said plurality of data sources is provided with an identity indicator prior to said Learn Engine receiving substantially any data from said at least some of said plurality of data sources.

17. The method of claim 16 wherein said process of identifying said identity indicator with said sequence is accomplished by a Learn Engine, said Learn Engine organizing said sequence so as to send a particle stream to said K Engine, whereby said identity indicator is included within said particle stream.

18. The method of claim 1 further comprising recording in an interlocking trees datastore an event for said identity indicator.

19. The method of claim 18 wherein said recording in an interlocking trees datastore of said event for said identity indicator comprises:
    creating a node in said interlocking trees datastore for said identity indicator, and
    integrating said identity indicator node into a path within said interlocking trees datastore for said sequence.

20. The method of claim 18 wherein said sequence is recorded in an interlocking trees datastore as a series of events including said identity indicator whereby for each particle of said sequence a count is added to all nodes and a pointer to a node at the end of the sequence is returned by said K Engine.

21. A computer readable storage medium including digitally encoded data readable by a processing system providing a KStore stored therein, the KStore comprising an interlocking trees datastore structure comprising nodes and non-root nodes organized into a plurality of connected trees, the plurality of connected trees comprising an asCase tree and at least one of a plurality of asResult trees, the asCase tree comprising a first root and at least one of a plurality of non-root nodes, the at least one non-root node comprising a first Case node, and the at least one asResult tree comprising a second root node representing a particle of a particle stream and at least one of a plurality of non-root nodes common with the nodes of the asCase tree, the at least one non-root node common with the nodes of the asCase tree comprising a first Result node, the interlocking trees data store comprising asCase and asResult paths, wherein an asCase path comprises a sequence of sub-component nodes linked with bi-directional asCase links ending with an end-product node, wherein each sub-component node in the asCase path has a bi-directional asResult link to an elemental root node or end-product node comprising an asResult path, said KStore having at least a plurality of repository ID nodes identifying a given repository as a data source for each sequence of particles in the particle stream from said given repository that is recorded by said KStore within memory of a computing system.

22. The computer readable storage medium of claim 21 wherein said plurality of repository ID nodes are recorded in memory in a location logically just after a BOT node for said sequence from said given repository so that it is recorded as a first node of said sequence.

23. The computer readable storage medium of claim 21 wherein at least one of said plurality of repository ID nodes is different from at least one other of said plurality of repository ID nodes.

* * * * *